US011021095B2

(12) United States Patent
Spenner et al.

(10) Patent No.: US 11,021,095 B2
(45) Date of Patent: Jun. 1, 2021

(54) REPLACEMENT MULTIFUNCTION AUTOMOBILE LIGHT SYSTEM AND METHOD

(71) Applicant: J.W. SPEAKER CORPORATION, Germantown, WI (US)

(72) Inventors: Jeffrey L. Spenner, Hubertus, WI (US); Dragan Popovic, Germantown, WI (US); Michael Herre, Cedarburg, WI (US); Sanjay Bora, Germantown, WI (US); Troy A. VerStrate, Germantown, WI (US)

(73) Assignee: J.W. SPEAKER CORPORATION, Germantown, WI (US)

( * ) Notice: Subject to any disclaimer, the term of this patent is extended or adjusted under 35 U.S.C. 154(b) by 0 days.

(21) Appl. No.: 16/414,102

(22) Filed: May 16, 2019

(65) Prior Publication Data

US 2019/0359118 A1  Nov. 28, 2019

Related U.S. Application Data

(60) Provisional application No. 62/674,810, filed on May 22, 2018, provisional application No. 62/712,511, filed on Jul. 31, 2018.

(51) Int. Cl.
| | |
|---|---|
| *B60Q 1/076* | (2006.01) |
| *F21S 41/20* | (2018.01) |
| *B60Q 1/14* | (2006.01) |
| *F21S 41/147* | (2018.01) |
| *H05B 45/00* | (2020.01) |
| *H05B 47/19* | (2020.01) |

(52) U.S. Cl.
CPC .......... *B60Q 1/076* (2013.01); *B60Q 1/1423* (2013.01); *F21S 41/147* (2018.01); *F21S 41/285* (2018.01); *H05B 45/00* (2020.01); *H05B 47/19* (2020.01)

(58) Field of Classification Search
CPC ............................. B60Q 1/076; F21S 41/147
USPC ........................................................ 362/464
See application file for complete search history.

(56) References Cited

U.S. PATENT DOCUMENTS

2010/0302795 A1* 12/2010 McFadden .............. F21S 41/27
362/538

FOREIGN PATENT DOCUMENTS

WO        2008138106 A1    11/2008

OTHER PUBLICATIONS

European Patent Office, Extended European Search Report, Application No. 191753375, dated Nov. 28, 2019, 9 pages.

(Continued)

*Primary Examiner* — Christopher M Raabe
(74) *Attorney, Agent, or Firm* — Quarles & Brady LLP

(57) ABSTRACT

A remotely controllable headlight assembly for use on a vehicle, the assembly comprising a circuit board including a plurality of LEDs including at least a first low beam LED, a first high beam LED and at least one additional LED, optic elements supported adjacent the LEDs on the circuit board, a processor and a remote communication module coupled to the processor, the remote communication module configured to receive commands from a wireless device, wherein the commands instruct the processor to illuminate the at least one additional LED, wherein the processor controls the at least one additional LED based on the received wireless commands.

24 Claims, 31 Drawing Sheets

(56) References Cited

OTHER PUBLICATIONS

DS18 Sound—DS18 101 JHHL Headlights, YouTube, Mar. 9, 2018, 1 page.
GENSSI—7 inch DOT Street Legal LED Headlamp 7" w/DRL, YouTube, Jun. 13, 2016, 1 page.

\* cited by examiner

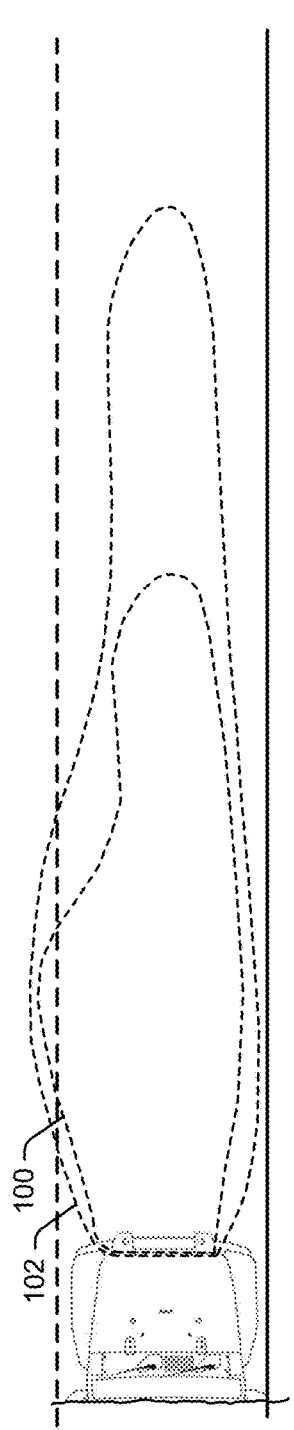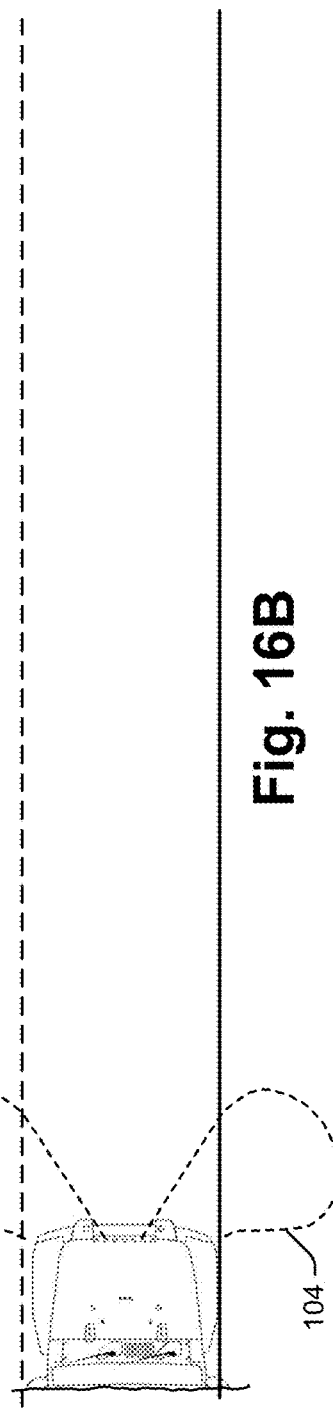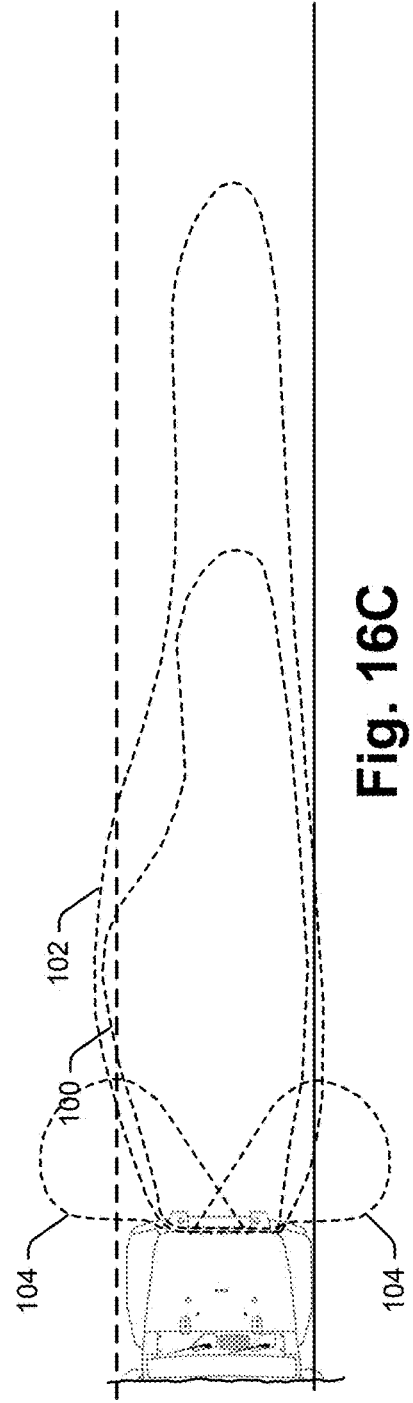

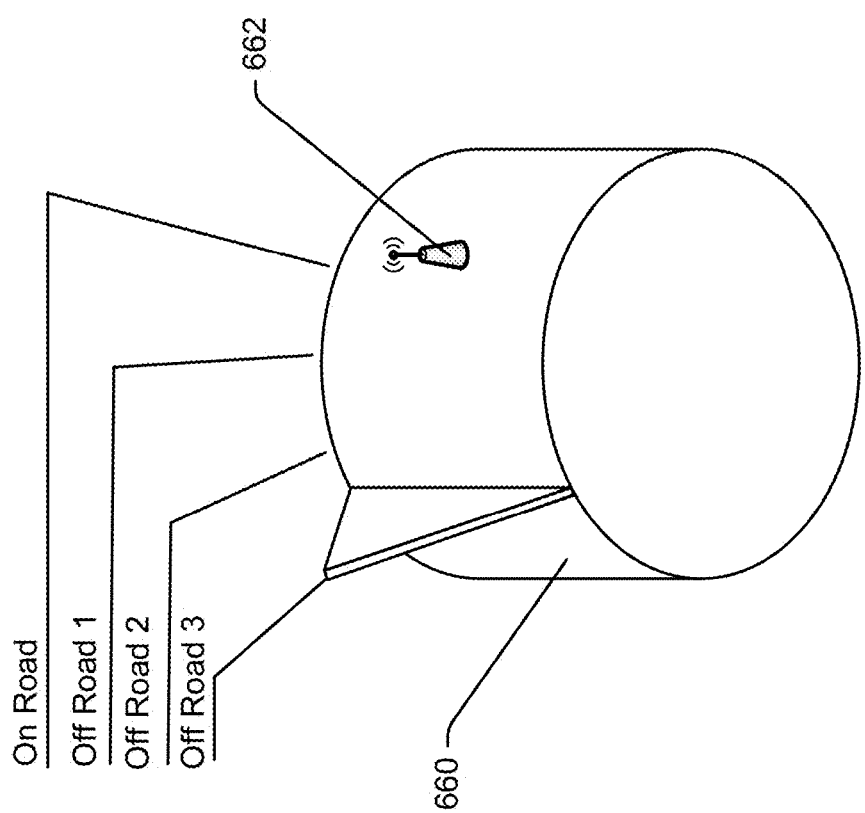

REPLACEMENT MULTIFUNCTION AUTOMOBILE LIGHT SYSTEM AND METHOD

CROSS-REFERENCE TO RELATED APPLICATIONS

This application claims priority to U.S. provisional application No. 62/674,810 which is titled "Remotely Controllable LED Headlight Systems And Methods" and was filed on May 22, 2018, and also claims priority to U.S. provisional application No. 62/712,511 which is titled "Remotely Controllable LED Headlight Systems And Methods" and which was filed on Jul. 31, 2018. These provisional applications are incorporated herein in their entirety by reference.

STATEMENT OF FEDERALLY SPONSORED RESEARCH OR DEVELOPMENT

Not applicable.

FIELD OF THE DISCLOSURE

The present technology relates to LED headlight systems and methods. More particularly, the technology relates to headlight systems that can be operated in high beam, low beam and at least a third beam mode and that are programmable by end users to operate in different user customized ways.

BACKGROUND

Most vehicles include some form of a vehicle headlight, along with other exterior lighting systems designed to generate light patterns that are optimized for certain driving conditions and circumstances. For instance, most headlights are designed to operate in two modes that are optimized for different on road driving circumstances including a high beam mode and a low beam mode.

The high beam mode generates a long distance light pattern in front of a vehicle to light the vehicles path along a roadway for an extended distance so that the user can see upcoming curves in the road and any obstructions well in advance. The low beam mode generates a shorter distance light pattern, usually with a relatively low light cutoff line (e.g., a light above which light intensity is relatively minimal) and often spreads light more broadly in front of the vehicle.

The high beam mode is optimal when there is no oncoming traffic near a vehicle while the low beam is optimal when oncoming traffic is relatively close to a vehicle and is patterned to reduce the blinding effect of light on drivers of oncoming vehicles. Some vehicles also come equipped with fog lights that can be turned on during low beam headlight operation to supplement low beam light when foggy environmental conditions occur.

High and low beam modes supplemented with fog lights enable drivers to choose light patterns optimized for most on road driving conditions. To this end, most roads are designed and constructed with driver safety in mind and therefore are often relatively straight and when curved, include gradual curves. Gradual curves and straight roads mean that light patterns that include light generally along a straight line trajectory in front of a vehicle are optimized. In many cases signs are posted along roadsides to warn drivers of road curves ahead or other obstructions so that drivers can adjust travel speed, vehicle trajectory, etc., to prepare to negotiate upcoming road anomalies.

While high and low beam headlight operating modes are optimized for on road driving, those modes are often inadequate for off road driving conditions. In this regard, off road driving by its very nature occurs in an uncontrolled environment where obstructions abound which make it difficult and in many cases impossible for drivers to travel long distances on straight or slightly curved trajectories. Thus, off road driving typically requires drivers to turn often and sharply to avoid obstructions. When turning, often there are other obstructions along new vehicle paths that need to be visually perceived and avoided. High and low beam light modes that place light generally along paths directly in front of a vehicle do not place sufficient lateral light intensity into fields to the sides of a vehicle to illuminate obstructions within vehicle turning paths for off road driving.

One solution for off road driving light is to add auxiliary side lights to a vehicle so that turning paths are illuminated. Here, a switch or other control device is used to control the auxiliary off road lighting when required. Jeep wrangles, many pickup trucks and some other vehicles are often driven off road and drivers of these vehicles routinely add auxiliary light devices for off road driving. While auxiliary lighting is the most common solution to off road lighting needs, this solution has several shortcomings.

First, most vehicles are not designed to allow drivers to integrate additional auxiliary lighting devices into the vehicle design so that auxiliary lighting devices need to be bolted on to these vehicles wherever there is a suitable spot. In most cases this means that auxiliary lighting devices mess up the aesthetic look of a vehicle to which they are added.

Second, in most cases auxiliary lights are not easy to install requiring a user to install a control switch and run dedicated wiring from a power source and the control switch to the auxiliary lighting devices.

Third, auxiliary light alignment to optimally suit a driver's preferences is difficult to set. To this end, many auxiliary light devices come with adjustable brackets so that the light devices can be swiveled or otherwise moved to different positions to adjust the trajectory along which light is directed. The process of redirecting light typically includes a driver getting out of a vehicle, loosening light device fasteners, changing light pattern trajectory, tightening fasteners and getting back into a vehicle to check if the trajectory meets the driver's preferences. If the trajectory is off, the process is repeated.

Fourth, most auxiliary lights have only two settings, on and off, and there is no way to adjust the pattern of light generated by the devices. Thus, most auxiliary lights cannot be adjusted to customize light pattern to personal preferences.

One other problem with some vehicle headlights is that originally equipped headlights simply do not generate light intensity at a level that is optimal for many drivers. In short, the headlights are not bright enough for many users. For this reason, with some vehicles, drivers routinely replace original equipment headlights in order to increase light intensity. Jeep Wranglers have relatively low intensity original equipment headlights and therefore original equipment Wrangler headlights are often replaced.

One vehicle component that has recently been the subject of great design detail is the headlight assembly. New materials, light devices and manufacturing capabilities have enabled many different headlight designs which are used by manufacturers to increase overall appeal of vehicle aesthetics and drivers look to the headlight as an outward symbol of quality. For this reason, in some cases where certain vehicles comes with relatively simple headlight assemblies, drivers have decided to purchase replacement aftermarket headlights that have more appealing designs and styles. Again, one vehicle where original equipment headlights are routinely replaced for aesthetic reasons is the Jeep Wrangler While basic replacement headlight mounting on vehicles like the Jeep Wrangler and some trucks is relatively simple, fine positioning of headlights to align high and low beam light patterns per regulatory requirements is often difficult and, in some cases, simply foregone either because installers do not recognize incorrect alignment or they simply do not want to go through the often tedious process of proper alignment.

Thus, it would be advantageous to have a different solution for adding off road lighting capabilities to a vehicle where light devices are aesthetically integrated into a vehicle and where off road light control can be facilitated without requiring additional wiring or manual switch type devices. It would also be advantageous if a driver could adjust off road lighting effects in some way other than manually redirecting auxiliary light devices. It would also be advantageous if there were some easier way for an installer to finely adjust headlight orientation to meet regulatory requirements.

BRIEF SUMMARY OF THE DISCLOSURE

A remotely controllable headlight assembly for use on a vehicle, the assembly comprising a circuit board including a plurality of LEDs including at least a first low beam LED, a first high beam LED and at least one additional LED, optic elements supported adjacent the LEDs on the circuit board, a processor and a remote communication module coupled to the processor, the remote communication module configured to receive commands from a wireless device, wherein the commands instruct the processor to illuminate the at least one additional LED, wherein the processor controls the at least one additional LED based on the received wireless commands.

In some cases the assembly further includes a connector for connecting the assembly to a power source and to original equipment control cables for receiving control signals for controlling the high and low beam LEDs. In some embodiments the at least a first high beam LED includes a plurality of high beam LEDs and wherein the at least a first low beam LED includes a plurality of low beam LEDs. In some embodiments the at least a first additional LED includes a plurality of additional LEDs.

In some embodiments the at least a first additional LED includes a plurality of LEDs and wherein the plurality of LEDs includes a first subset of a first color and a second subset of a second color. In some embodiments the at least a first additional LED includes at least a first LED that is aligned with a laterally projecting optic lens that directs light laterally. In some embodiments the I headlight assembly is mounted as a right side headlight assembly to a vehicle, the laterally projecting optic directing light laterally to the left side of the vehicle. In some embodiments the laterally projecting optic protrudes in a forward direction and includes a light emitting surface proximate a lateral portion of the headlight assembly.

In some cases the assembly further includes at least another additional LED and an associated optic adjacent the another additional LED. In some embodiments the headlight has a height dimension and wherein optics associated with the at least a first additional LED are centrally located with respect to the height dimension. In some embodiments the at least a first additional LED includes at least first and second LEDs, optics associated with the first LED and optics associated with the second LED configured to facilitate different types of lighting effects.

In some embodiments the at least a first additional LED is controlled to be illuminates as a day running light. In some embodiments the optics adjacent the first additional LED include a diffusion plate. In some embodiments the optics adjacent the first additional LED include an optic lens adjacent the diffusion plate.

In some embodiments the processor is programmable and wherein the at least a first additional LED is programmable to operate in at least first and second different ways. In some embodiments the processor further receives programming signals wirelessly from a computing device usable to program the processor. In some embodiments the at least a first additional LED includes at least one lateral light beam LED and at least one day running light LED.

A remotely controllable headlight assembly for use on a vehicle, the assembly comprising a circuit board including a first plurality of low beam LEDs, a second plurality of high beam LEDs, a third plurality of LEDs and at least one additional LED, optic elements supported adjacent each of the LEDs on the circuit board, a processor and a connector for connecting the assembly to a power source and to original equipment control cables for receiving control signals from original equipment user inputs for controlling the first and second pluralities of LEDs and a wireless transceiver for receiving control signals independent of the original equipment control cables for controlling the at least one additional LED to create a lateral light beam pattern.

In some embodiments the connector assembly includes dual connectors for connecting to a first original equipment head light cable and a second original equipment turn signal control cable. In some embodiments the third plurality of LEDs are controlled as a turn signal indicator. In some embodiments the third plurality of LEDs operates as a day running light when not controlled as a turn signal indicator.

A remotely controllable headlight assembly for use on a vehicle, the assembly comprising a headlight housing forming a cavity, a transparent headlight cover lens having a height dimension and mounted to the housing to cover the cavity, the cover lens having a vertical centerline, a circuit board including a first plurality of low beam LEDs, a second plurality of high beam LEDs, a third plurality of turn signal LEDs and at least one side beam LED, the circuit board mounted within the cavity, a side beam optic lens mounted to one side of the vertical centerline and adjacent the side beam LED to direct light in a direction generally away from the vertical center line, a turn signal optic that extends from adjacent the side beam optic lens across the vertical centerline, the turn signal optic adjacent the third plurality of turn signal LEDs, a plurality of high beam optic elements, a separate high beam optic element adjacent each one of the second plurality of LEDs, a subset of the high beam optic elements above the turn signal optic a subset of the high beam optic elements below the turn signal optic and a plurality of low beam optic elements, a separate low beam optic element adjacent each one of the first plurality of LEDs, all of the low beam optic elements above the turn signal optic.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

FIG. 16A shows high and low beam light patterns that may be generated via the headlight assemblies in FIG. 1, FIG. 16B shows lateral light beams that may be generated via the headlight assemblies in FIG. 1 and FIG. 16C shows combined high, low and lateral light beams that may be generated via the headlight assemblies in FIG. 1;

FIG. 31 is a perspective view of a mechanical control device that is consistent with at least some aspects of some embodiments of the present disclosure.

Figure 1:
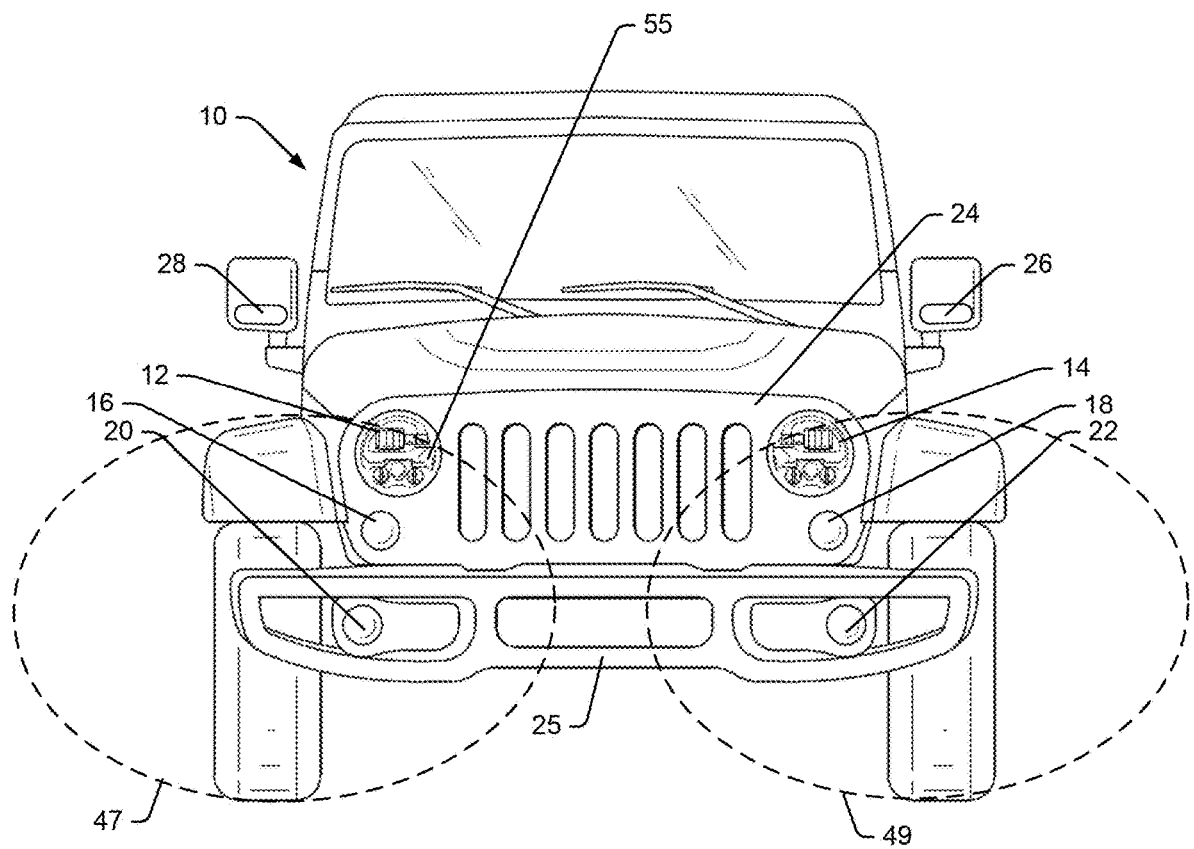
FIG. 1 is a front view of a vehicle having an LED lighting system including a left headlight assembly and a right headlight assembly in accordance with embodiments of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF THE DISCLOSURE

The following discussion is to be read with reference to the figures, in which like elements in different figures have like reference numerals. Further, the following discussion is presented to enable a person skilled in the art to make and use embodiments of the disclosure. Various modifications to the illustrated embodiments will be readily apparent to those skilled in the art, and the principles herein can be applied to other embodiments and applications without departing from embodiments of the disclosure. Thus, the disclosure is not intended to be limited to embodiments shown, but is to be accorded the widest scope consistent with the principles and features disclosed herein.

It is to be understood that the use the phraseology and terminology used herein is for the purpose of description and should not be regarded as limiting. Furthermore, the use of "right," "left," "front," "back," "upper," "lower," "above," "below," "top," or "bottom" and variations thereof herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, the terms "component," "system," "device," "module," and the like are intended to refer to either hardware, a combination of hardware and software, software, or software in execution. The disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

As used herein, unless otherwise specified or limited, the terms "processor" and "processor device" may include one or more processors and memories and/or one or more programmable hardware elements. As used herein, the terms "processor" and "processor device" is intended to include any of types of processors, CPUs, microcontrollers, digital signal processors, or other devices capable of executing software instructions.

As used herein, unless otherwise specified or limited, the term "memory" includes a non-volatile medium (e.g., a magnetic media or hard disk, optical storage, or flash memory), a volatile medium, such as system memory, (e.g., random access memory (RAM) such as DRAM, SRAM, EDO RAM, RAMBUS RAM, DR DRAM, etc.), or an installation medium, such as software media (e.g., a CD, DVD, flash drive, and so on), on which programs may be stored and/or data communications may be buffered. The term "memory" may also include other types of memory or combinations thereof.

As used herein, unless otherwise specified or limited, "at least one of A, B, and C," and the like, is meant to indicate A, or B, or C, or any combination of A, B, and/or C. As such, these and similar phrases can include single or multiple instances of A, B, and/or C, and, in the case that any of A, B, and/or C indicates a category of elements, single or multiple instances of any of the elements of the category (or categories).

The invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, diodes, look-up tables, etc., which may carry out a variety of functions under the control of one or more processors or other control devices. Other embodiments may employ program code, or code in combination with other circuit components.

In accordance with the practices of persons skilled in the art of computer programming, the present disclosure may be described herein with reference to symbolic representations of operations that may be performed by various computing components, modules, or devices. Such operations may be referred to as being computer-executed, computerized, software-implemented, or computer-implemented. It will be appreciated that operations that can be symbolically represented include the manipulation by the various processor devices of electrical signals representing data bits at memory locations in the system memory, as well as other processing of signals. The memory locations where data bits are maintained are physical locations that have particular electrical, magnetic, optical, or organic properties corresponding to the data bits.

Referring now to the drawings wherein like reference numerals correspond to similar elements throughout the several views and, referring specifically to FIG. 1, an exemplary vehicle 10 is shown that includes, among other things, a grill 24 and a bumper 25 and a plurality of light devices including right and left (from a driver's prespective) headlights 12 and 14 and additional light devices 16, 18, 20 and 22 that may serve various functions. In an originally equipped vehicle, for instance, light devices 16 and 18 may be provided as turn signal light devices that blink on and off to indicate turning while devices 20 and 22 may be fog light devices.

Referring still to FIG. 1, grill 24 forms 7 inch headlight holes to accommodate headlights 12 and 14 as well as 2.5 inch holes for accommodating turn signal devices 16 and 18. Bumper 25 forms three inch fog light holes for receiving fog lights 20 and 22. Although not shown, mounting brackets are provided within each of the light accommodating holes for mounting an accommodated light device where the brackets enable an installer to adjust the trajectory of an associated light device as well known in the art.

Figure 2:
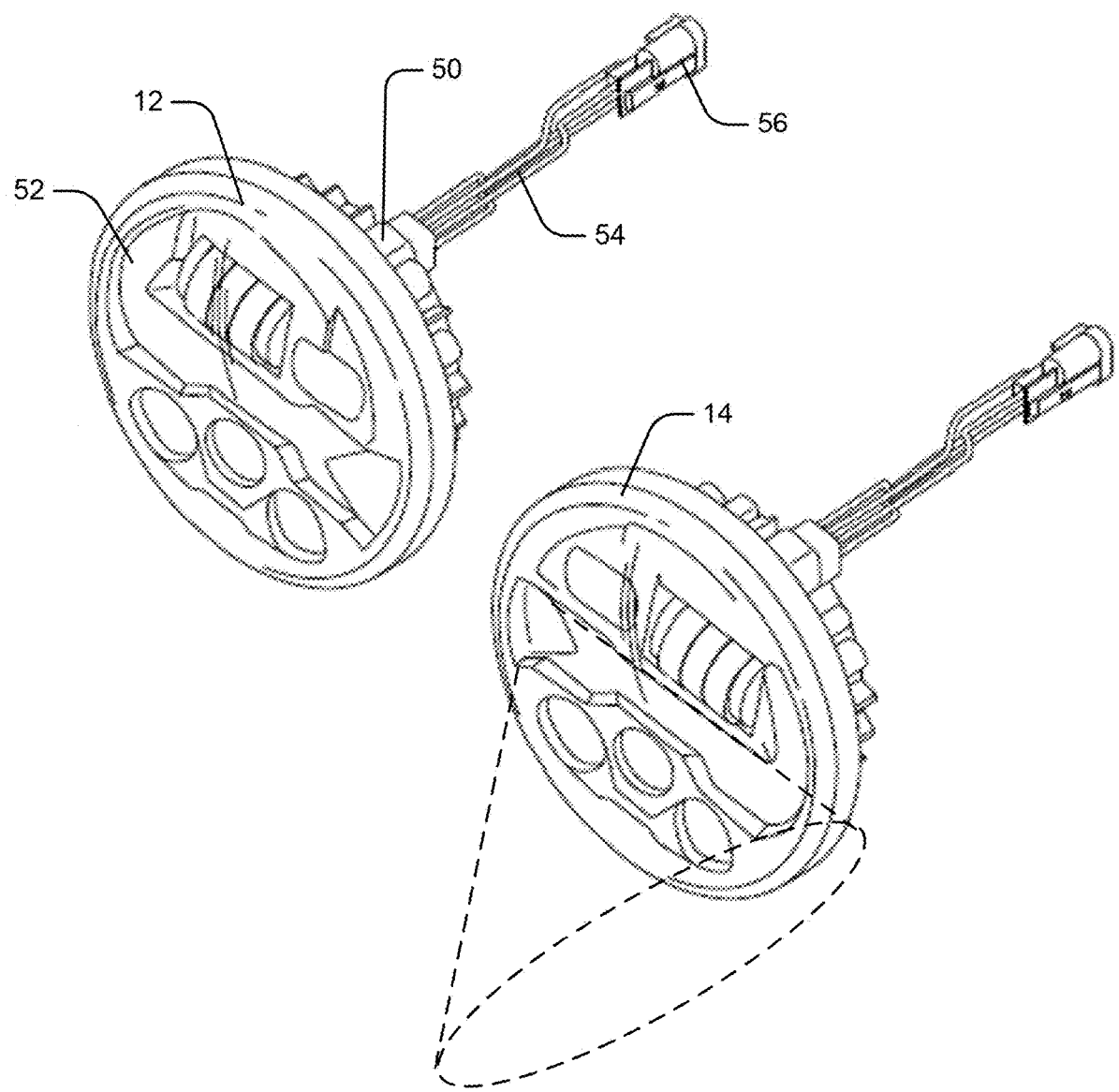
FIG. 2 is a perspective view of a left headlight assembly and a right headlight assembly in accordance with embodiments of the present disclosure.

Referring now to FIG. 2, exemplary right and left headlight assemblies 12 and 14 are illustrated in perspective view where each of the light assemblies includes similar components that operate in a similar fashion. Hereafter, unless indicated otherwise, because of the similarity in construction and operation and in the interest of simplifying this explanation, only right headlight device 12 will be explained in any detail.

Headlight device 12 includes a housing 50, a lens cover 52, a wire harness 54 and a harness connector 56. Housing 50 includes a front side that forms a housing cavity and a front housing rim edge and forms a plurality of heat dissipating fins that extend radially and rearward from a rear surface. Housing 50 is formed of metal to increase the rate of heat dissipation that occurs into the ambient. Wire harness 54 extends out an opening in the rear wall of the housing 50 and terminates at connector 56. Lens cover 52 is clear and shaped like a flattened dome and forms a rear edge that is shaped and dimensioned the same as the front edge of the housing 50 so that cover 52 can be mounted to the housing 50 in a fashion that conceals and sealed other headlight assembly component therein.

Figure 3:
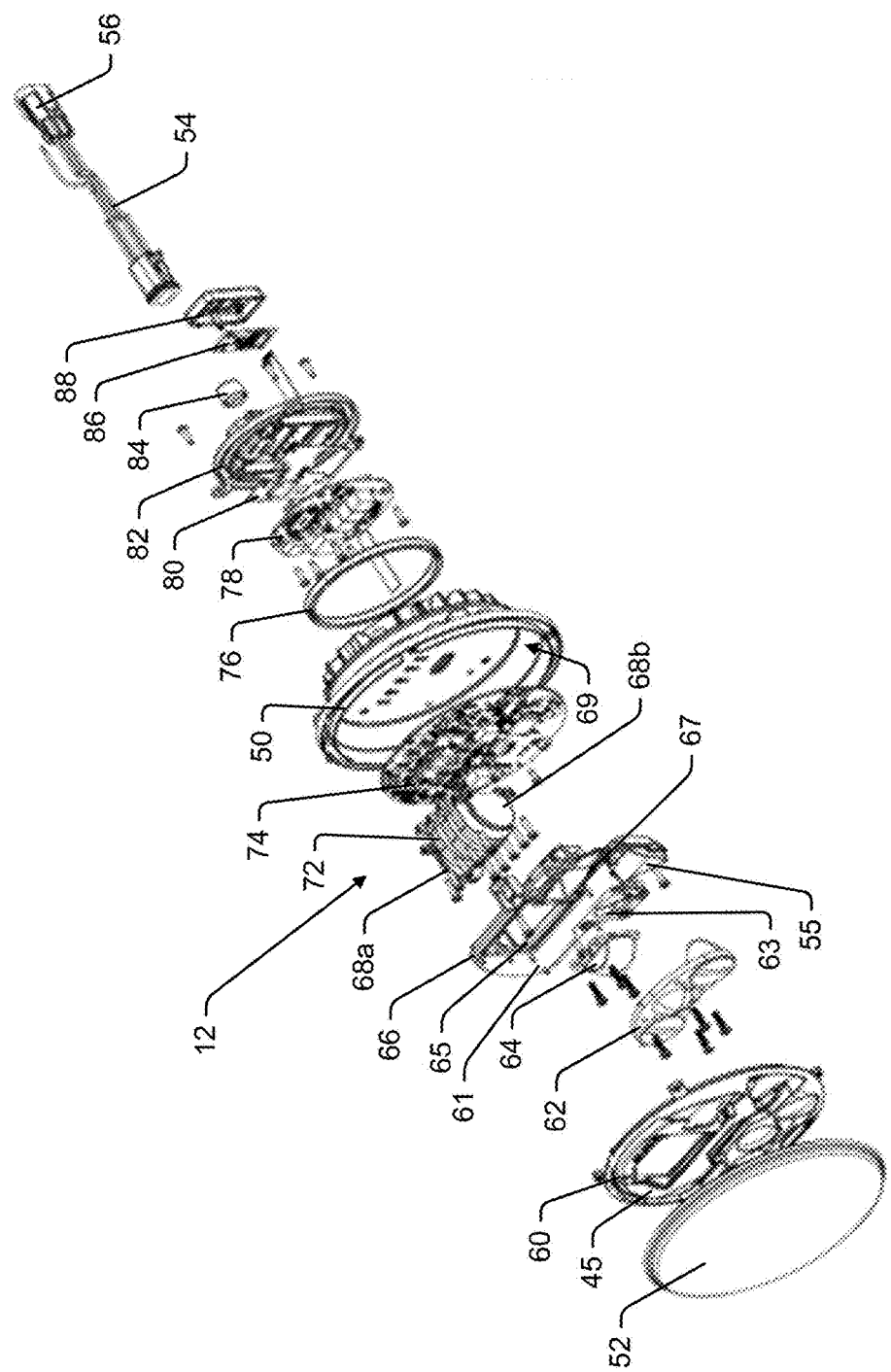
FIG. 3 is an exploded view in perspective of the left headlight assembly shown in FIG. 2 in accordance with embodiments of the present disclosure.

Referring to FIG. 3, in addition to the cover 52, housing 50, wire harness 54 and cable connector 56, exemplary headlight 12 also includes a bezel 60, a high beam lens assembly 62, a low beam lens 64, an intermediate housing carrier 66 including a facetted plate 61, first and second skinny D lenses 68a and 68b (i.e., a lens that has a D-shape when viewed laterally along a vertical cross section), three wide D lenses 72, a printed circuit board 74 with LED engines or sources mounted thereto, a gasket 76, another printed circuit board 78, an insulator member 80, a back cover 82, a vent cap 84, a Bluetooth printed circuit board 86 and a Bluetooth module cover 88. Each of circuit board 74, lenses 68a, 68b, 72, 64 and 62, intermediate housing carrier 66 and bezel 60 are mounted within the housing cavity 69 formed by housing member 50 or at least between housing 50 and cover 52 once the cover is sealed to the front housing edge.

Figure 4:
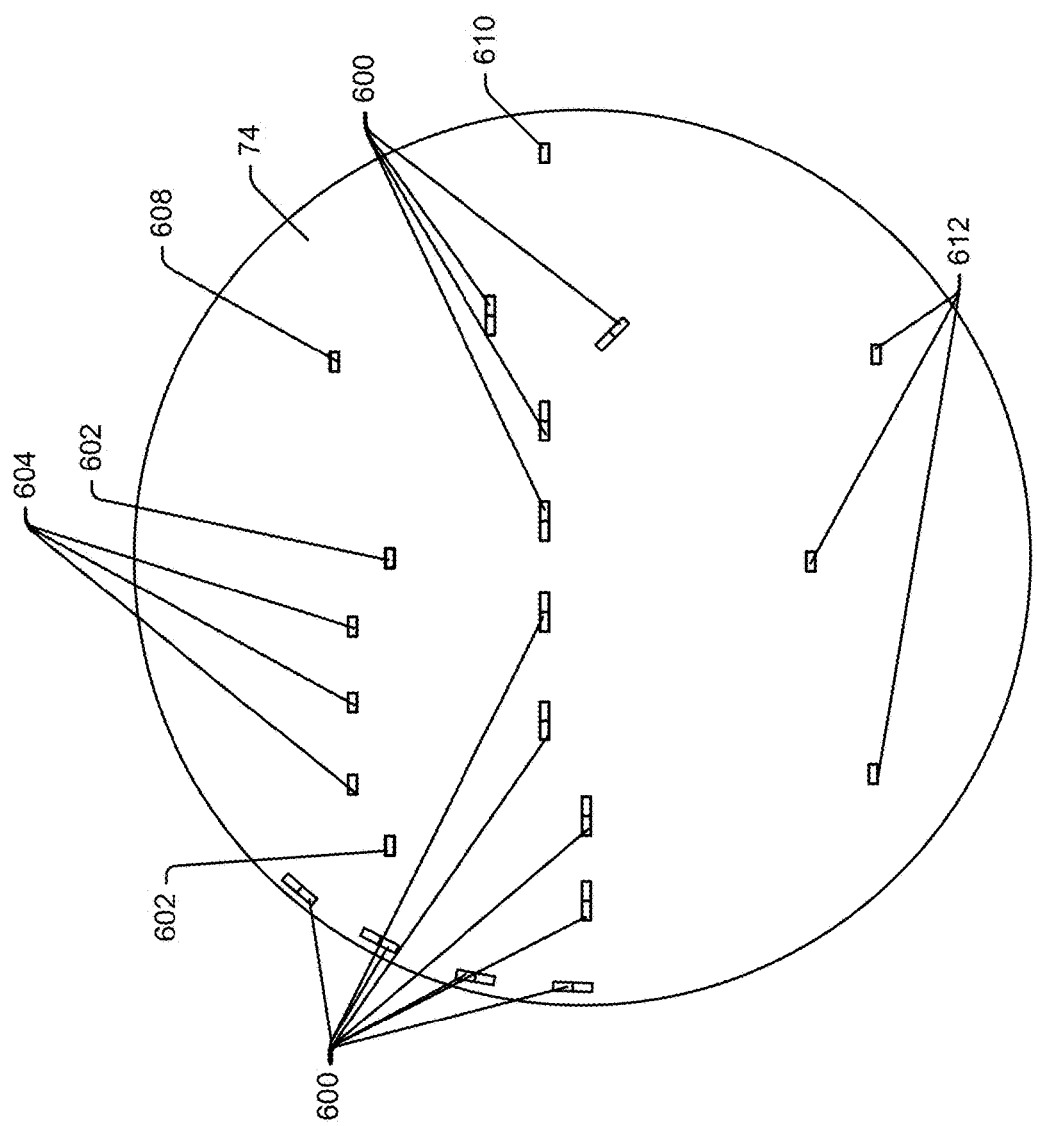
FIG. 4 is a plan view of one of the circuit boards shown in FIG. 3 that shows locations of LEDs on the board in at least one embodiment that is consistent with at least some aspects of the present disclosure.

Referring also to FIG. 4, among other control circuitry, board 74 includes a plurality of LED light devices (e.g., LEDs, light engines, etc.) 600, 602, 604, 606, 608, 610, one or more separate LEDs for each of the assembly lenses and a plurality of LEDs 600 that are arranged to be located behind the signature facetted plate 61. Each of the LEDs 600 that are located behind the facetted plate 61 includes first and second LEDs of different colors (e.g., white and amber) as illustrated where one or the other or both of the LEDs may be illuminated to generate illumination at different wavelengths to provide different lighting effects as described in more detail hereafter. While the LEDs 600 are shown as first and second LEDs it should be appreciated that in at least some embodiments each of the LEDs 600 lay include a single LED device that is controllable to generate first and second or a plurality of different light colors such as, for instance, the Hue type light devices that are manufactured by Philips. In FIG. 4, it can be seen that there are 10 LEDs 600 arranges behind plate 61. In some embodiments the spacing between each two adjacent LEDs 600 will be less than one inch and in particularly advantageous embodiments that spacing will be less than ¾ths of an inch.

Figure 5:
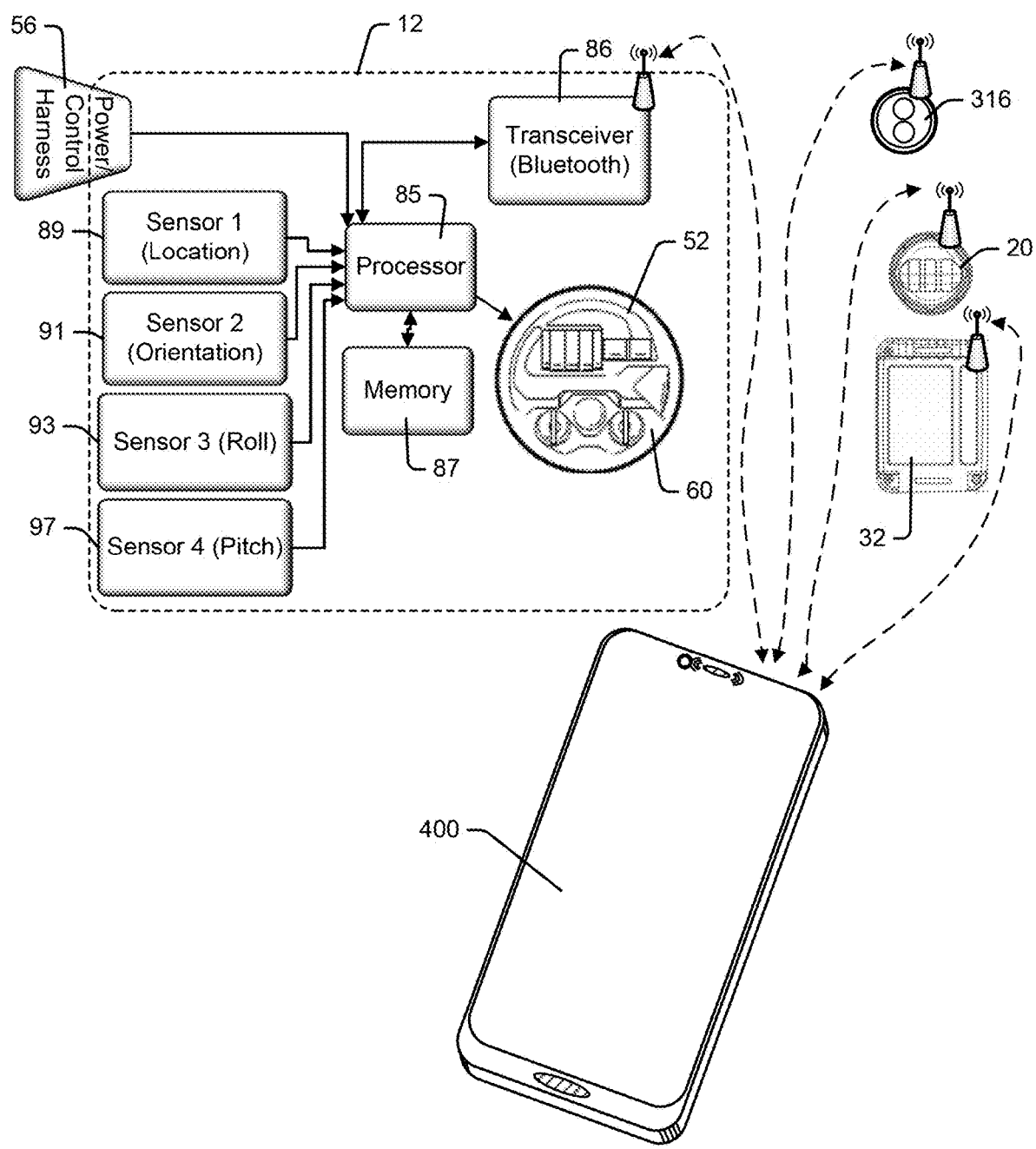
FIG. 5 is a schematic illustrating one of the headlights of FIG. 1, other light devices and a portable computing device used to program and control vehicle lighting device that is consistent with at least some aspects of the present disclosure.

Hereafter the light devices 600-610 will be referred to as LEDs but it should be understood that each LED may be replaced by an LED light engine or other LED device that includes two or more LEDs on a single chip or a larger LED surface on a chip device. FIG. 5 show other headlight components that are formed by the circuitry 74 which include, among other things, a processor 85 and a memory device 87. In at least some cases other headlight devices may include various sensor types like a location sensor 89, an orientation sensor 91, a roll sensor 93, a pitch sensor 97, etc.

Figure 6:
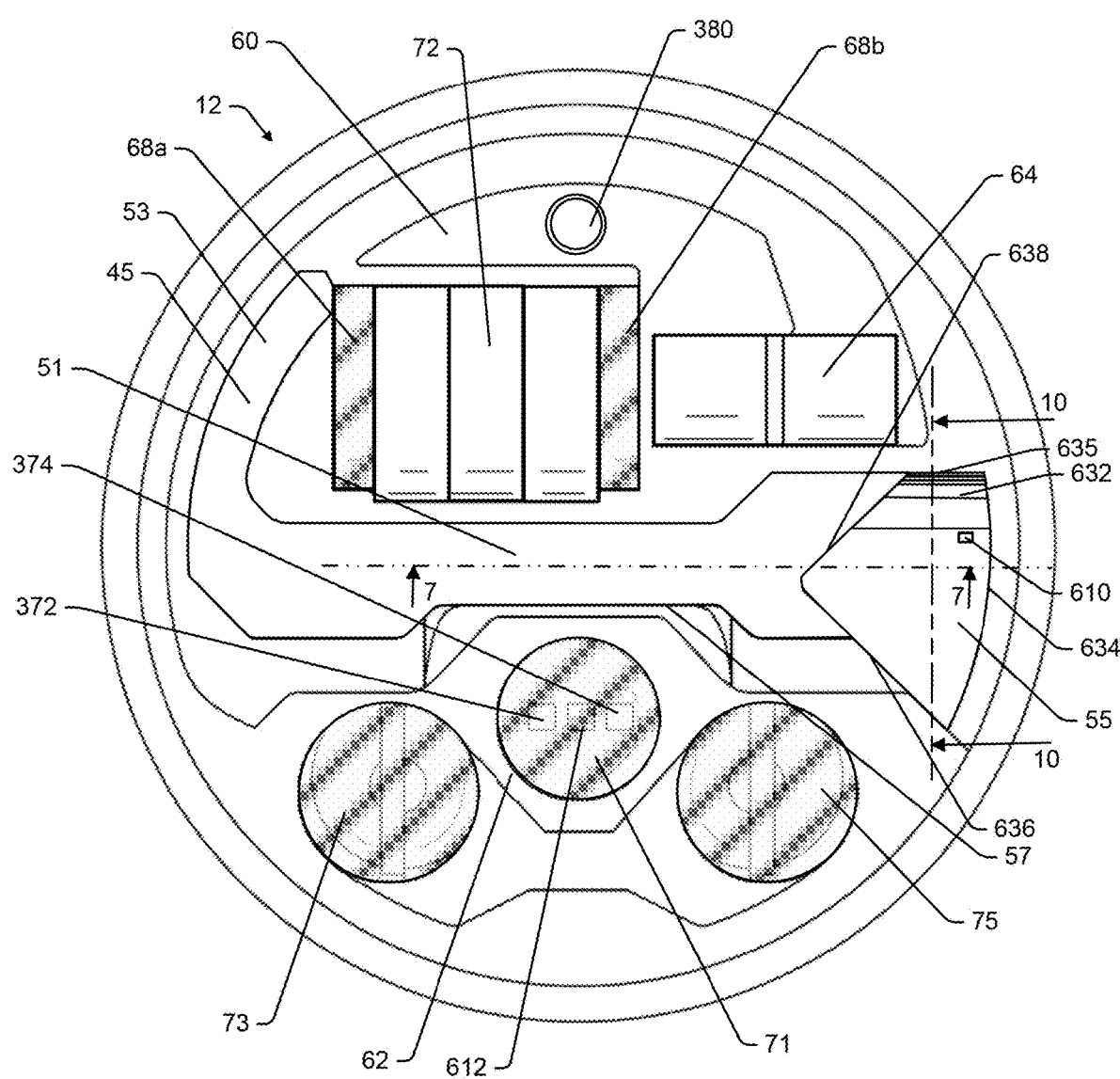
FIG. 6 is a front plan view of one of the headlight assemblies of FIG. 1 in a first illuminated state.

Referring also to FIG. 6, the three wide D lenses 72 are arranged side by side and mounted via screws directly in front of three LEDs so that light generated by each LED passes through the aligned lens and is shaped thereby to emanate along desired trajectories. The three wide D lenses 72 are shaped and positioned with respect to LEDs 604 (see again FIG. 4) to cause a light pattern that spreads wide.

Skinny D lenses 68a and 68b are arranged on opposite sides of the three pack of wide D lenses 72 and are aligned with LEDs 602. Each lens 68a and 68b is thinner than each of the lenses 72 and has a shorter height dimension (see FIG. 6) and shorter radial optic dimension. Top surface portions of lenses 68a and 68b are at the same height as top surface portions of lenses 72 (see FIG. 6). Each of lenses 68a, 68b and 72 is fastened via screws directly to circuit board 74. Looking at the relative positions of LEDs 604 to wide D lenses 72 in FIGS. 4 and 6, respectively, and comparing those positions to the relative positions of the LEDs 602 to narrow D lenses 68a and 68b, it should be appreciated that LEDs 604 are arranged relatively lower with respect to lenses 68a and 68b than are LEDs 602 with respect to wide D lenses 72 so that light from LEDs 604 emanates from lenses 68a and 68b along higher trajectories than the light that emanates from LEDs 602 and from lenses 72.

Intermediate housing carrier 66 is a plastic molded member that forms several openings or cavities for passing lens optics or LED light through. Specifically, carrier 66 forms four openings including a first opening 65 through which front portions of each of D lenses 68a, 68b and 72 extends, a second opening 67 for passing light into the low beam lens 64 and a third opening 63 for passing light into a portion of the high beam lens assembly 62. In addition, carrier 66 forms an opening (not shown) to allow light to pass from the board mounted LEDs through the facetted plate 61.

Figure 7:
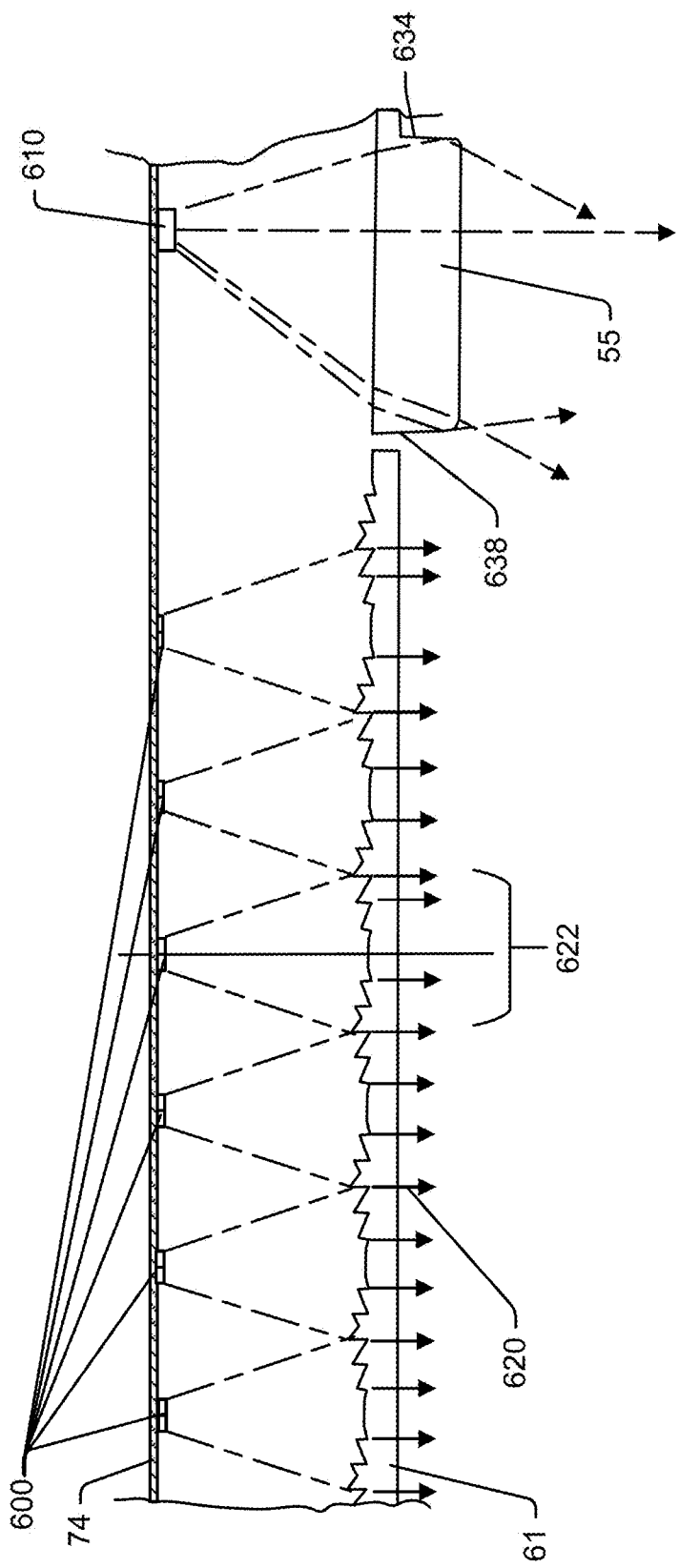
FIG. 7 is a partial cross sectional view of the exemplary headlight assembly shown in FIG. 6 taken along the line 7-7.

Referring also to FIG. 6, facetted plate 61 can be seen to have a fanciful "nike-shape" in front plan view including a long horizontal section 51 with a two pronged and pointed fork at a right end as illustrated and an upwardly extending curved finger member 53 at the left end. Plate 61 also includes an upwardly recessed lower portion 57 on the long horizontal section. When configured with other assembly components, the plurality of LEDs 600 are located behind the facetted plate 61 and illuminate that plate member when powered. Referring also to FIG. 7, facetted plate 61 (shown in cross section) is light transmissive and includes a plurality of star burst facet sets 622 (shown in cross section in FIG. 7), one set arranged to be aligned with each of the LEDs 600, so that light from each of those LEDs is collimated and redirected generally in a forward direction as illustrated by light trajectories 620.

As described above, in at least some embodiments more than one color light LED may be provided behind facetted plate 61 where different colored LEDs are powered at different times to provide different lighting effects and for different purposes. For instance, separate white and amber light LEDs may be provided behind plate 61 for generating white and amber light, respectively. Other light colors are contemplated and in at least some embodiments three, four or more different light colors are contemplated. In addition in at least some cases one or more light LEDs that reside behind plate 61 may be controllable to generate two or more different light colors and may be controllable to generate different light colors at different times.

Referring still to FIG. 3, low beam lens 64 is designed and positioned with respect to the associated LED 608 (see also FIG. 4) to generate a low beam light pattern when assembly 12 is properly installed on a vehicle. Lens 64 is a side sliced partial barrel shape as illustrated that is generally a cylindrical partial shape where the external surface forms a slight convex arc from top to bottom. Lens 64 is fastened via screws to intermediate housing carrier 66 to cover opening 67 so that lens 64 aligns with an associated LED 608 mounted on board 74.

High beam lens assembly 62 is designed and positioned with respect to associated LEDs 612 (see also FIG. 4) to generate a partial high beam light pattern when assembly 12 is properly installed on a vehicle. Lens assembly 62 includes a central dome optic 71 and first and second side optics 73 and 75 where each side optic includes a light focusing cone member open to the board 74 so that an associated LED is located within the open end of the cone upon installation. Lens assembly 62 is fastened via screws to intermediate housing carrier 66 so that central dome optic 71 is aligned with opening 63 and an associated LED 612 (central as illustrated) mounted to board 74 and with each of the focusing cones extending past carrier 66 and to associated LEDs 612 (lateral as illustrated) on board 74.

Figure 8:
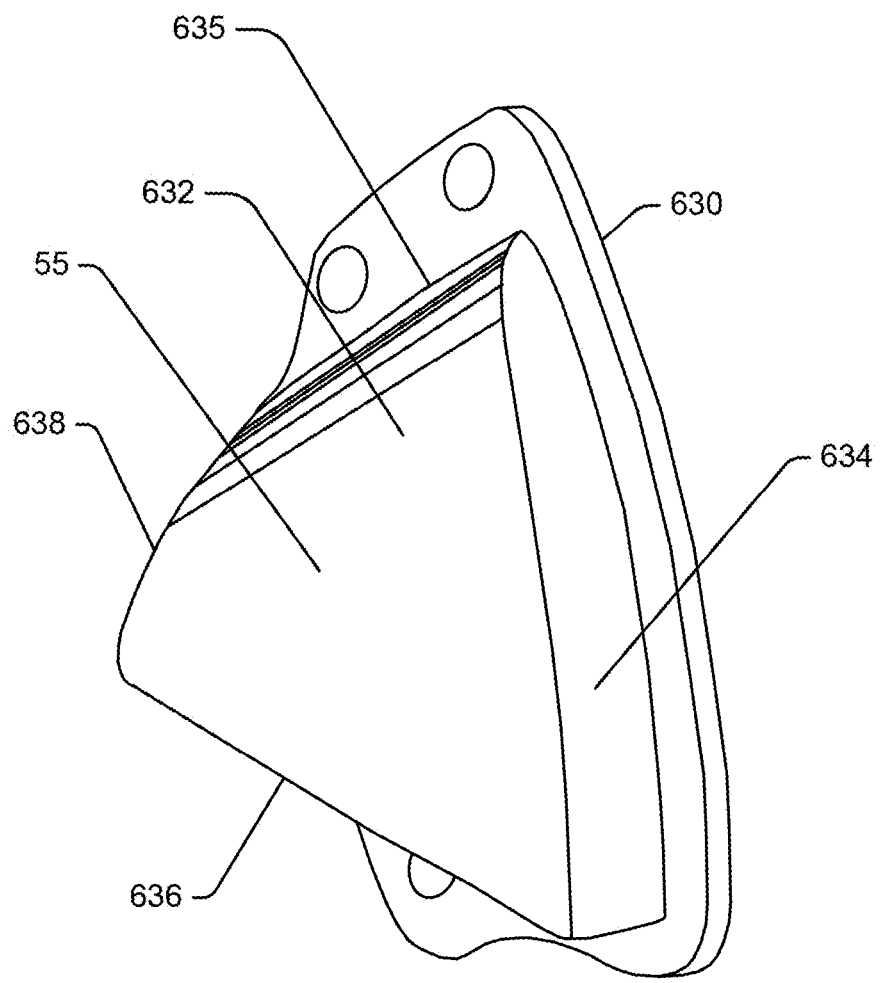
FIG. 8 is a perspective view of the lateral light pipe optic shown in FIG. 6.
Figure 9:
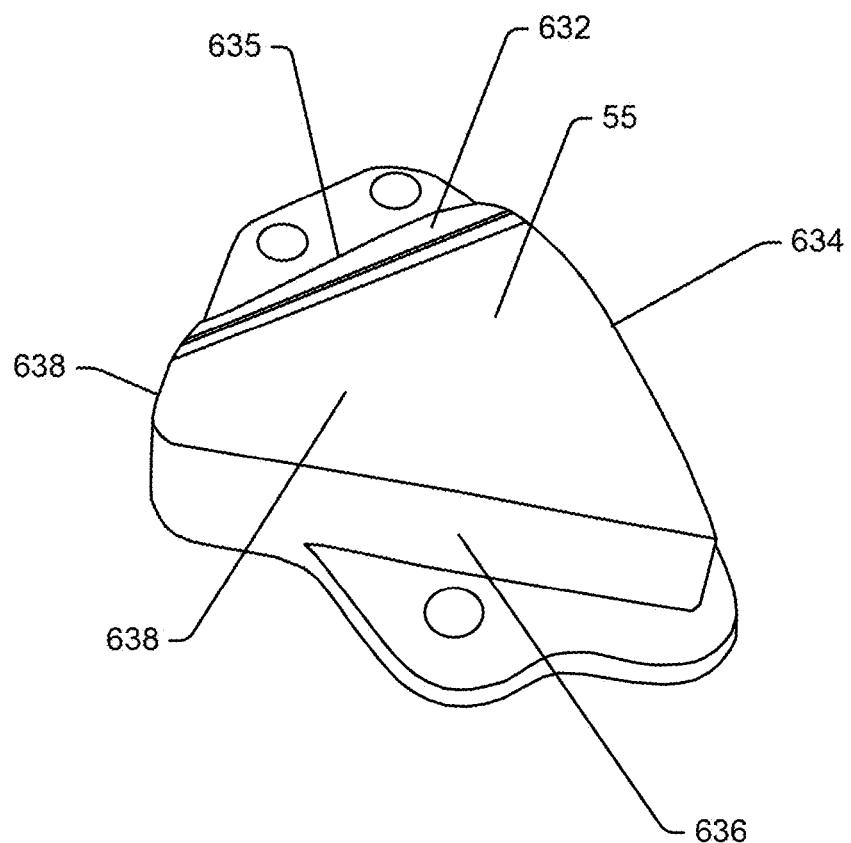
FIG. 9 is another perspective view of the lateral light pipe optic shown in FIG. 6 from a different angular perspective.
Figure 10:
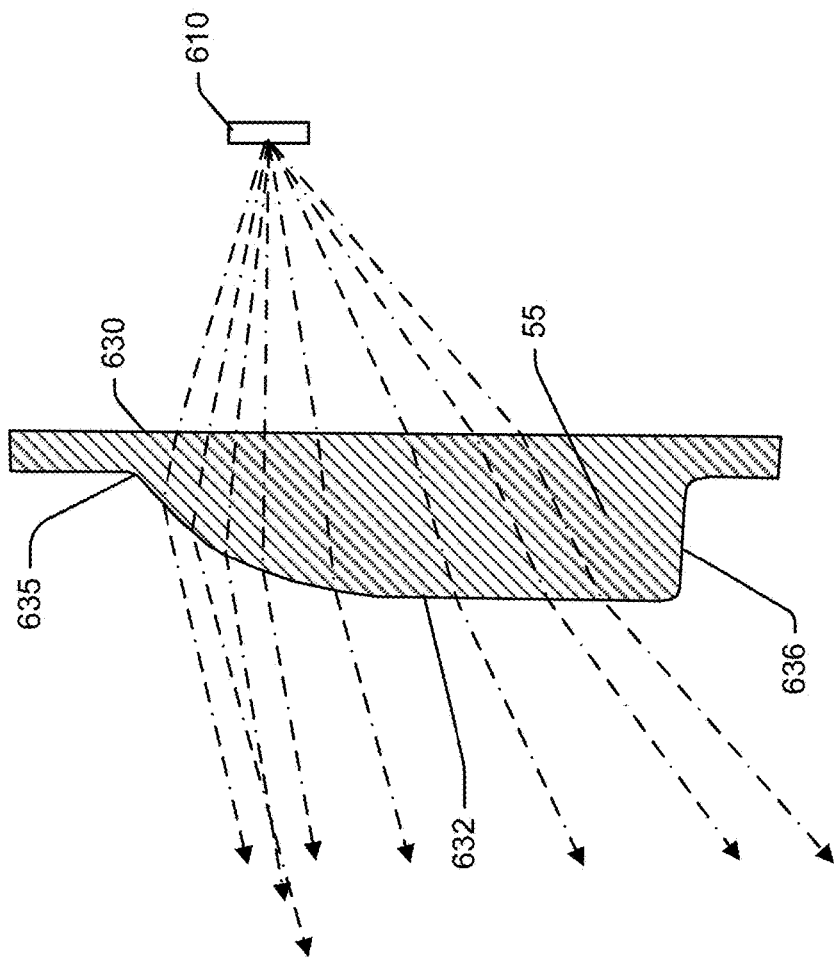
FIG. 10 is a cross sectional view taken along the line 10-10 in FIG. 6 through the lateral light pipe optic member.

Referring still to FIGS. 3 and 6, intermediate housing carrier 66 also includes a generally truncated triangularly shaped light pipe lens 55 to the right of facetted plate 61. Referring also to FIGS. 8 through 10, pipe lens 55 includes a rear surface 630 facing an LED 610 (see FIGS. 4 and 10) on board 74, a partial reflecting front surface 632 opposite the rear surface, a lateral curved surface 634 that curves generally to match the contour of an outer shape of the light assembly, a radially downward angled surface 636, an upper straight edge 635 and a generally radially upward angled surface 638. As best seen in FIG. 10, partial reflecting front surface 632 is convexly curved from upper edge 635 toward the downward angled surface 626 with the degree of curvature degreasing from upper edge 635 toward surface 626. In some embodiments the angle of surface 632 with respect to vertical adjacent upper edge 635 is within a range between 20 and 75 degrees and in particularly advantageous cases the angle is between 40and 60 degrees while surface 632 is substantially vertical adjacent lower surface 636.

When installed for use, upper straight edge 635 is generally horizontal and aligned substantially vertically with an upper edge of facetted plate 61 and the signature optic 45 that resides in front of the facetted plate 61 (see FIG. 6) with curved surface 634 aligned with an outer contour of the assembly 12. Also, once installed, as shown in FIG. 7, LED 610 is located generally to the right of center of the pipe 55 and, as shown in FIGS. 6 and 10, is vertically aligned with an upper section of pipe 55 (e.g., approximately one third of a total height dimension of the lens 55 from upper edge 635).

FIG. 7 shows that light from LED 610 enters the pipe lens 55 and is generally angled forward and from right to left as illustrated so that a generally forward and left lateral light pattern is formed. FIG. 10 shows that the light into pipe lens 55 is generally angled forward and downward when viewed from the side. Thus, LED 610 and lens 55 form a light pattern that emanates forward, to the side and downward once installed and powered.

Figure 11:
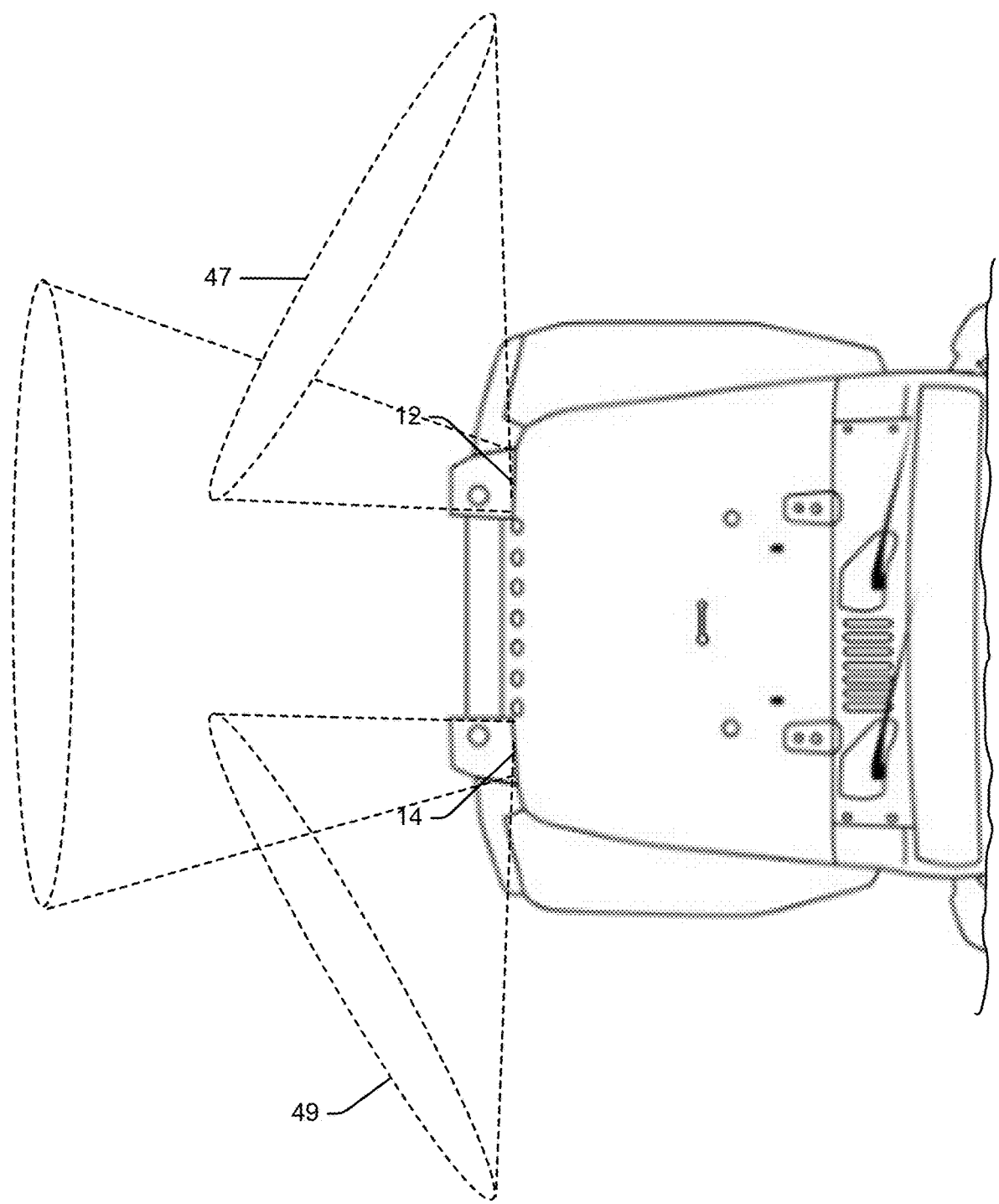
FIG. 11 is a top plan view of the front of a vehicle showing exemplary lateral light patterns generated by the headlight assemblies of FIG. 1 that are consistent with at least some aspects of the present disclosure.

When the LED aligned with light pipe lens 55 is illuminated, the front surface of pipe lens 55 glows when viewed from a vantage point in front of assembly 12 but the majority of light generated by the LED is redirected by the front surface of the pipe to the side. In this regard, see the light pattern 47 represented by the dashed lines in each of FIGS. 1 and 11 that shows light emanating from light assembly 12 as illustrated to illuminate a lateral space to the side of the vehicle as illustrated (e.g., to the right from a vehicle driver's perspective). Referring again to FIGS. 1 and 5, light assembly 14 includes a light pipe lens and associated LED similar to light pipe lens 55 and its associated LED, albeit where the pipe in assembly 14 generates a light pattern 49 that emanates from right to left in FIG. 1 to illuminate a lateral space to the other side of the vehicle as illustrated (e.g., to the left from a vehicle driver's prespective).

Figure 12:
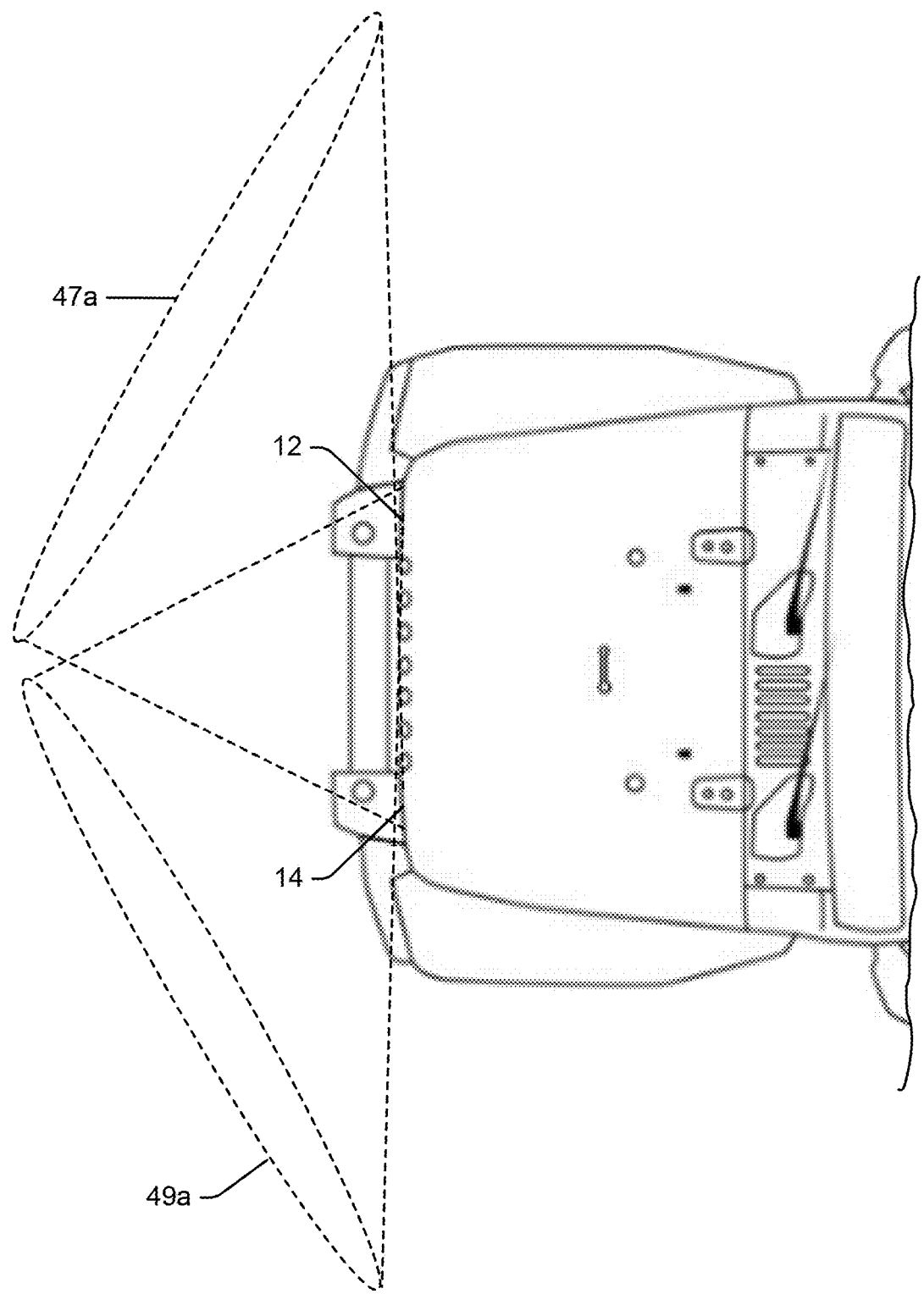
FIG. 12 is similar to FIG. 11, albeit showing a different lateral light pattern that is consistent with at least some aspects of the present disclosure.

In other embodiments it is contemplated that different pipe lens configurations may be formed and arranges with respect to associated LEDs such that light emanating from each of those lenses emanated laterally to an opposite side of the vehicle from the mounted side of the associated light assembly. To this end, see, for instance, the alternative lateral light patterns 47a and 49a shown in FIG. 12 where each of the patterns crosses from a mounted side of the vehicle to the opposite side to illuminate a lateral field. Several advantages are associated with the cross vehicle lighting arrangements like the one illustrated in FIG. 12. First, because the light pipe lenses 55 illuminate across a vehicle, light from the pipes travels further and spreads to illuminate a larger pattern to the side of the vehicle than would be possible if the same light structure were aimed to the opposite side of the vehicle to provide a more optimal light pattern. Second, as seen in FIG. 12, at least some vehicles have fenders over front wheels that extend forward of the vehicle grill. By providing cross vehicle lateral lighting pipe lenses, the pipe lenses are spaced further away from the front ends of the fenders and therefore the fenders are less obstructing and enable better and relatively more lateral light patterns.

Referring again to FIG. 3, bezel 60 is plastic, generally circular member that mounts to the front circular edge of housing 50 to provide a finished appearance to portions of the light assembly 12 that surround assembly optics and that can be seen through cover lens 52. Bezel 60 has oppositely facing front and rear surfaces where the front surface forms many different facets and plateaus, some of which are purely for appearance while others are functional. Bezel 60 forms six openings that are aligned with the combined D lens subassembly 68a, 68b and 72, the low beam optical lens 64, each of the three high beam lenses 71, 73 and 75 and the side illuminating light pipe 55. Bezel 60 also forms a separate frosted nike-shaped signature optic 45 that aligns with and generally covers facetted plate 61 when assembly 12 is constructed. Optic 45, in at least some embodiments, stands proud of the front surface of the bezel. Optic 45 is formed as an integral part of the bezel by using two different polycarbonate materials, one dark (e.g., black) and opaque which forms much of the bezel and a second that is clear to form the optic 45. The optic 45 is frosted or otherwise patterned on at least one of the front and rear surfaces to diffuse and at least somewhat scatter light that exists optic 45. In at least some embodiments the frosting or pattern effect may be applied to optic 45 after the optic is formed while in other cases the frosting or pattern may be formed via texturing directly in a mold component. In some embodiments the pattern effect may be applied to the rear surface of optic 45, the front surface of optic 45 or to both the rear and front surfaces of optic 45. When LEDs 600 aligned with optic 45 are illuminated, that light is collimated by facetted plate 61 and then scattered by the frosting or pattern effect to travel along many angled trajectories so that optic 4 appears to substantially uniformly glow with the color of light generated by the illuminated LEDs. Thus, when white LEDs 600 are illuminated, signature optic 45 glows white and when amber LEDs 600 are illuminated, signature optic 45 glows amber.

It is to be appreciated that the functionality of the carrier 66 and the bezel 60 can be combined, or can be arranged in various ways and may include more than one carrier assembly or bezel component and the description herein is not intended to be limiting unless specifically claimed or indicated otherwise. In the illustrated embodiment, it should be appreciated that the carrier 66 and bezel 60 generally provide support for different optical elements and other light structures at different distances from the underlying LED supporting circuit board 74 so that optics with different dimensions are optimally positioned to generate desirable lighting effects. Thus, for instance, the D shaped lenses that mount directly to the board 74 have light entry surfaces that are closer to associated light LEDs than do other optics that mount to the intermediate carrier 66.

Referring again to FIG. 3, second circuit board 78 and insulator 80 are mounted between housing 50 and the rear cover member 82 with gasket 76 sealing cover 82 to housing 50. Board 78 connects to first circuit board through electrical connectors that extend through a housing rear wall. Vent cap 84 is mounted in cover 82. Bluetooth transceiver board 86 is mounted between module cover 88 and a rear surface of cover member 82 outside the main housing structure. While described as a Bluetooth transceiver board 86, board 86 may be any of various known and future developed wireless or wired interfaces including, but not limited to, cellular, Wi-Fi, near field technology (NFC), ZIGBEE®, or other wireless or wired communication technologies. Bluetooth is a registered trademark of the Bluetooth Special Interest Group in the United States and/or other jurisdictions. Most mobile devices are capable of multiple forms of wireless communications.

Wiring harness 54 can be removably coupled to the control circuit board through the rear cover. A first end of the wiring harness can include a headlight plug, e.g., an H13 connector as a non-limiting example, and the rear cover, or the control circuit board, or a combination of both, can include a mating headlight receiver and gasket to sealingly receive the headlight plug. A second end of the wiring harness can include a vehicle wiring connector. The vehicle wiring connector can sealingly couple to a mating vehicle wiring connector (not shown) included with the vehicle. In some embodiments, the wiring harness can include one or more wires for directly coupling to the vehicle, such as a ground wire, or a power wire, as non-limiting examples.

In operation, the LEDs associated with assembly optics can be controlled in different ways to generate different lighting effects. Throughout this disclosure, assembly optics that are illuminated with white light will be indicated by left up to right cross hatching and optics illuminated with amber light will be indicated by double diagonal cross hatching. For instance, in FIG. 13, each of optics 72 and 64 are shown illuminated white while the signature optic 53 is shown illuminated amber (e.g., double hatched).

Referring again to FIG. 6, assembly 12 is shown with high beam optics illuminated which include optics 71, 73 and 75 as well as the two skinny D optic elements 68a and 68b wherein light from those optics combines to provide an optimized high beam light pattern. In FIG. 6 the signature frosted optic 45 is not illuminated.

Figure 13:
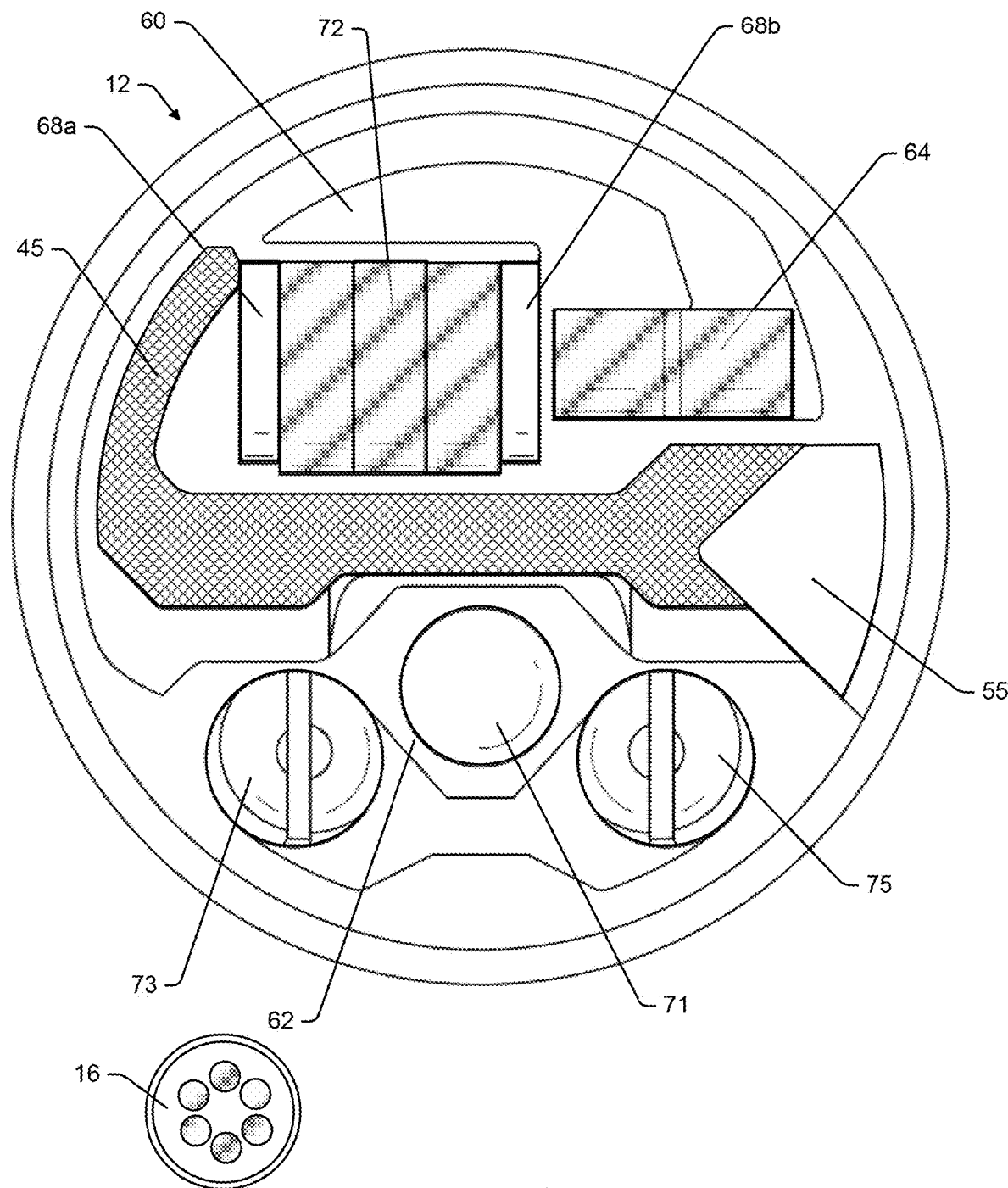
FIG. 13 is similar to FIG. 6, albeit showing the headlight assembly in a second illumination state.

Referring to FIG. 13, assembly 12 is shown with low beam optics illuminated which include each of the wide D optic elements 72 (only one labelled) as well as the low beam optic element 64 wherein light from those optics combine to provide an optimized low beam light pattern. In FIG. 13 the signature optic 45 is illuminated amber (e.g., double cross hatched). Here, signature optic 45 may be used as an amber day running light (DRL), as an amber turn signal blinking light or as both an amber DRL and blinking turn signal (e.g., persistently lit as a DRL and blinking as a turn signal light). While not shown, signature optic 45 may also operate in a different mode as a white light DRL and then blink amber (e.g., back and forth between amber and white or amber and off) as a turn signal device. Where other light colors are possible, signature optics 45 may be controlled in other fashions to suit needs and user preferences.

Figure 14:
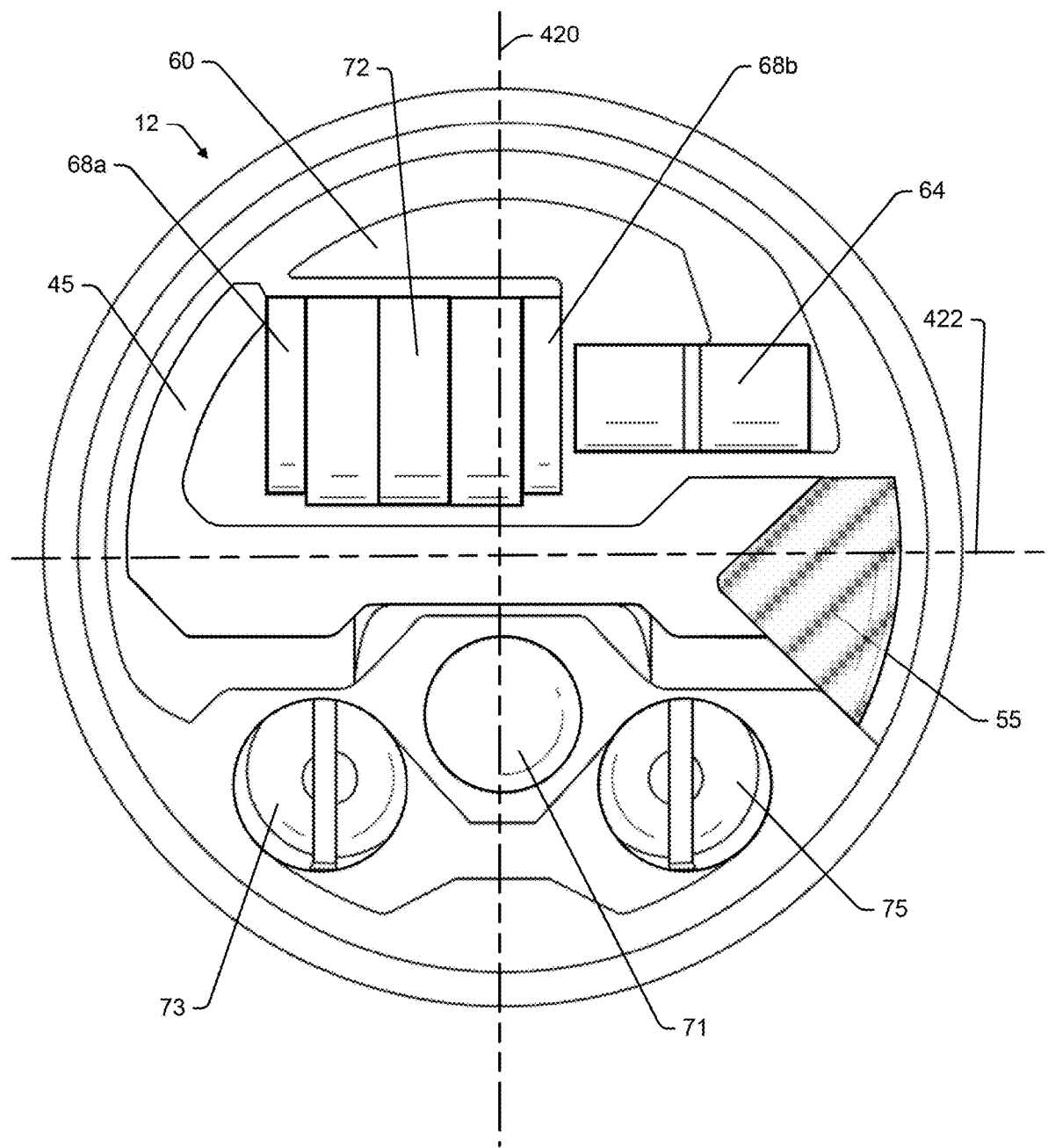
FIG. 14 is similar to FIG. 6, albeit showing the headlight assembly in a third illumination state.

Referring to FIG. 14, assembly 12 is shown with lateral or side beam optics illuminated which includes optic light pipe lens 55 and no other optics.

Figure 15:
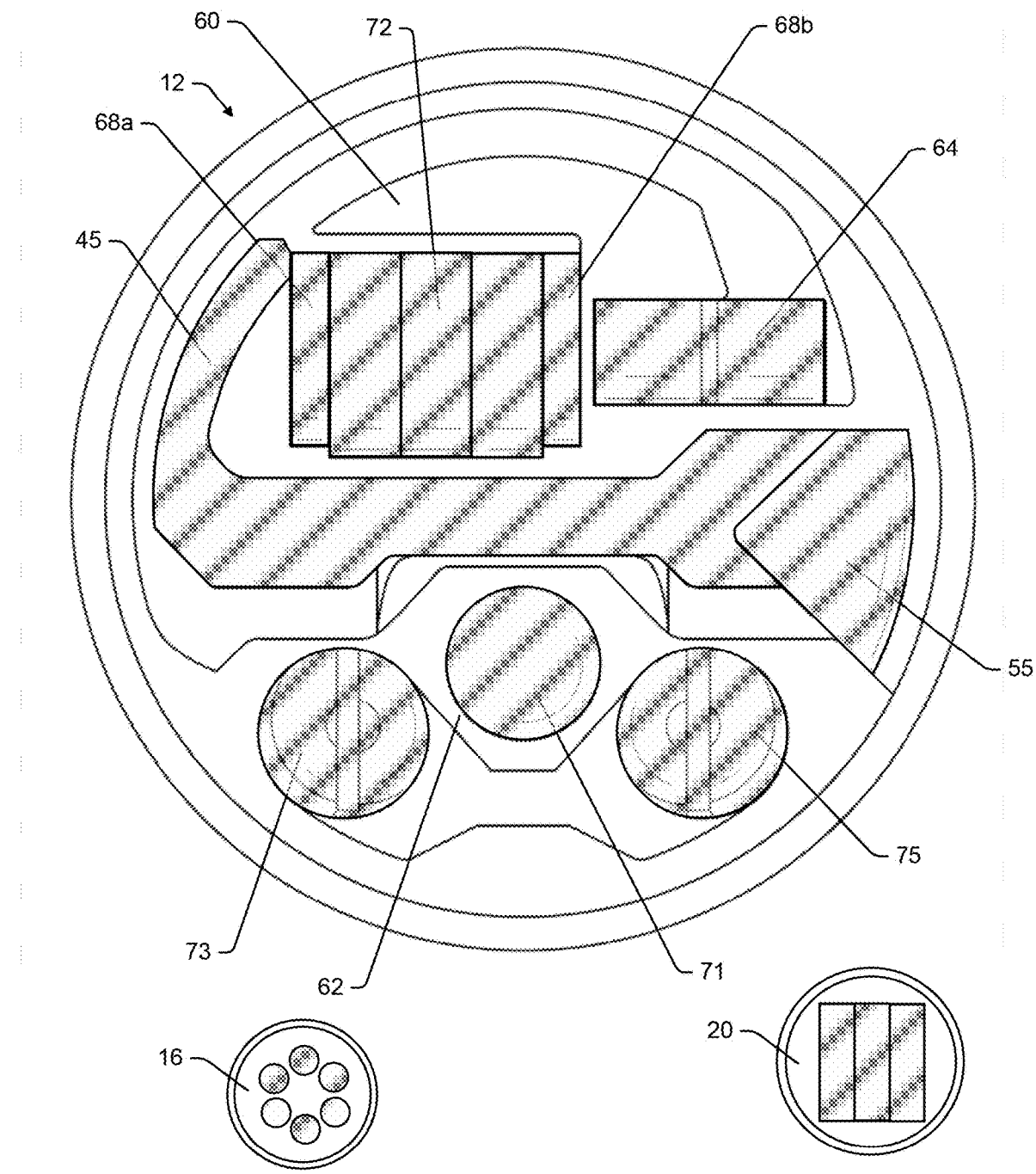
FIG. 15 is similar to FIG. 6, albeit showing the headlight assembly in a fourth illumination state.

Referring to FIG. 15, assembly 12 is shown with all of the assembly optics illuminated white (e.g., left up to right cross hatching) including the high beam optics 68a, 68b, 71, 73 and 75, low beam optics including wide D optic elements 72 (only one labelled) as well as the low beam optic element 64, the lateral pipe lens 55 and the signature optic 45. While illuminating all of the optics in assembly 12 may not be suitable for on road activities, off road it may be advantageous at times to generate as much light as possible to see upcoming obstructions and the like.

In at least some cases where signature optic 45 is used as a turn signal light device, a secondary original equipment light device that was provided as a turn signal device may no longer be needed for the purpose of turn signaling. For this reason, in at least some cases it is contemplated that one other advantage associated with at least some embodiments of the disclosed headlight assembly is that turn signal light devices may be replaced with other auxiliary light devices useful for other purposes. For instance, turn signal light devices may be replaced with additional fog light devices or other light devices optimized for off road activities to further increase a driver's ability to see clearly. To this end, see again FIG. 13 where signature optic 45 is illuminated amber (e.g., double cross hatched) to indicate a blinking turn signal and where an original equipment turn signal light device (not illustrated) has been replaced with a high intensity auxiliary light device 16 that is illuminated white and which operates to further supplement light in front of an associated vehicle. In FIG. 15, auxiliary light device 16 is again shown illuminated along with the other assembly optics as described above for maximum light generation. In addition, original equipment fog light 20 is shown illuminated white in FIG. 15 to show that even this light can be illuminated when off road to increase light intensity when desired.

Referring now to FIGS. 16A exemplary low beam 100 and high beam 102 light patterns that result from assembly control associated with the low beam and high beam optic illumination patterns shown in FIGS. 13 and 16 are illustrated, respectively. As shown, the high beam mode results in greater light intensity at further distances in front of the vehicle than the low beam setting mode. FIG. 16B shows the lateral beam operating mode corresponding to optic illumination shown in FIG. 14 where lateral light beams 104 are generated to give a driver greater viewing capability laterally from the vehicle. FIG. 16C shows the combined high, low and lateral beam setting where all of the assembly 12 optics are illuminated as shown in FIG. 15. As illustrated, the combine beams 100, 102 and 104 result in extremely bright light in front of and to the sides of the vehicle that is optimized for off road driving.

Figure 17:
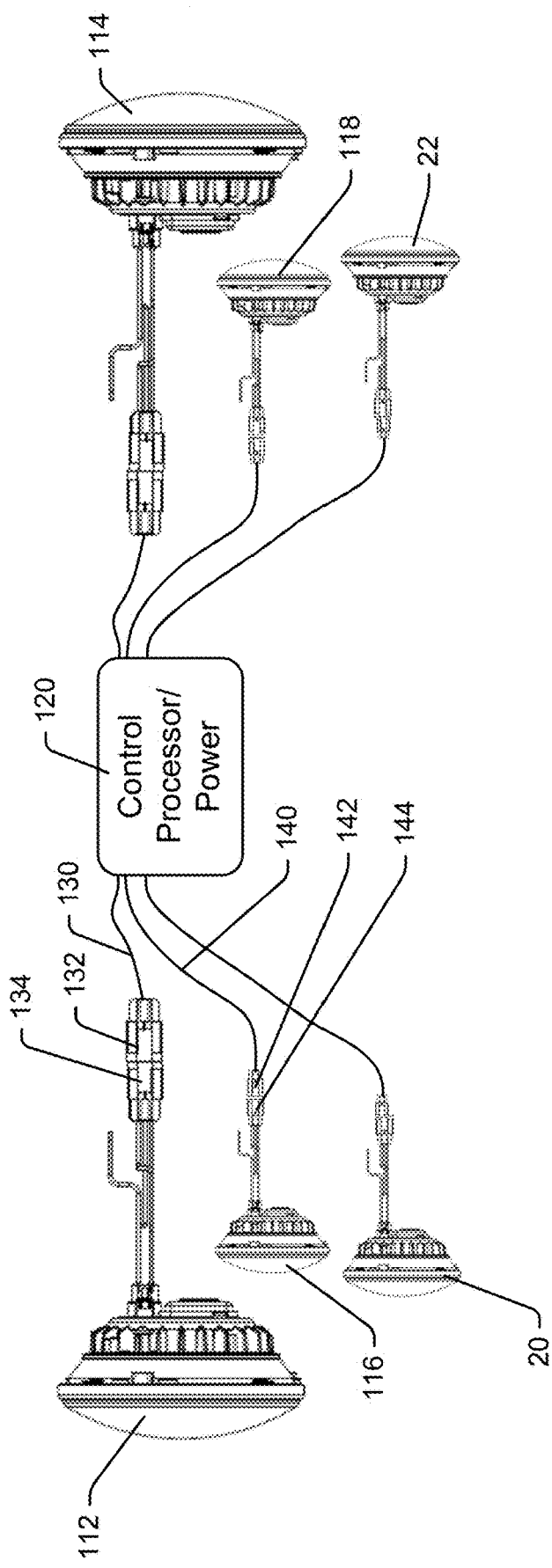
FIG. 17 is a diagram showing one way to link up vehicle light devices to a controlling processor.

As described above, in many cases an original equipment headlight assembly can only be controlled to provide standard high and low beam light patterns and turn signaling, day running lights and other lighting effects are provided via some other light device(s) if provided at all. For instance, referring to FIG. 17, an exemplary power and control cable arrangement that is typical with original equipment vehicle light arrangements is illustrated which includes a control processor and power source 120 that is linked to each of two original equipment headlight assemblies 112, 114, two original turn signal light devices 116 and 118 and two original equipment fog lights 20 and 22. As shown, a separate connector cable is provided for each of the light devices or assemblies 112, 114, 116, 118, 20 and 22 to feed power to each of those components as well as control signals for controlling illumination of light sources in each of those devices. Thus, for instance, processor/source 120 is linked via a first cable 130 to first headlight assembly 112 where cable 130 includes a connector 132 at a distal end that links to a connector 134 associated with light assembly 112. Similarly, processor/source 120 is linked via a second cable 140 to first turn signal device 116 where cable 140 includes a connector 142 at a distal end that links to a connector 144 associated with turn signal device 116. Processor/source 120 is programmed to provide blinking turn signals to device 116 when a driver indicates that the vehicle will be turning right. Processor/source 120 provides high and low beam control signals to headlight assembly 112 per driver input (e.g., via switch toggling or the like). Processor/source 120 provides other control signals independently to fog light 20 and to each of assemblies or devices 114, 118 and 22.

Where disclosed headlights 12 and 14 are swapped in for original equipment headlight assemblies and can be controlled to provide lighting effects in addition to simple high and low beam operating modes, additional control signals have to be provided to each of the headlight assemblies 12 and 14 for controlling the additional functions. For instance, where a replacement headlight assembly that is consistent with the present disclosure enables a driver to illuminate the signature optic 45 (see again FIG. 5) to provide a day running light, there has to be some way to get a control signals to assembly 12 in order to illuminate the LED associated with optic 45. As another example, where a replacement headlight includes a lateral light pipe optic 55 and associated LED for generating a lateral light beam pattern, there has to be some way to get a control signal to assembly 12 in order to illuminate the LED associated with the lateral light pipe optic when lateral light is needed. As yet another example, where a replacement headlight includes a signature optic 45 that can be controlled to provide a turn signal functionality, there has to be a way to get a turn control signal to assembly 12 to control the signature optic to indicate that a vehicle is turning or is about to make a turn.

The "additional" control signals needed to control the exemplary headlight assembly 12 fall into two different categories. A first category referred to as an "original equipment control signal" includes control signals that an originally equipped vehicle is already programmed to generate in normal operation and a second category referred to as a "supplemental control signal" includes control signals that are not generated by an originally equipped vehicle. For instance, a turn control signal is one exemplary original equipment control signal because an originally equipped vehicle comes with a control processor that already generates that signal in response to user input. A lateral light pipe and associated LED are components that are not provided as original equipment in most cases and therefore signals to control the lateral light pipe LED include supplemental control signals. Signals for controlling a day running light feature in a replacement headlight where an originally equipped vehicle did not include a day running light are also supplemental control signals. Other original equipment control signals and supplemental control signals are contemplated. For instance, some headlight embodiments may include other light generating components like built in fog light components that can be used to replace functionality associated with original equipment fog lights so that vehicle cavities that accommodate the existing fog lights can be used to accommodate some other desired lighting device(s) (e.g., more lateral light devices, additional fog light devices, etc.).

Figure 18:
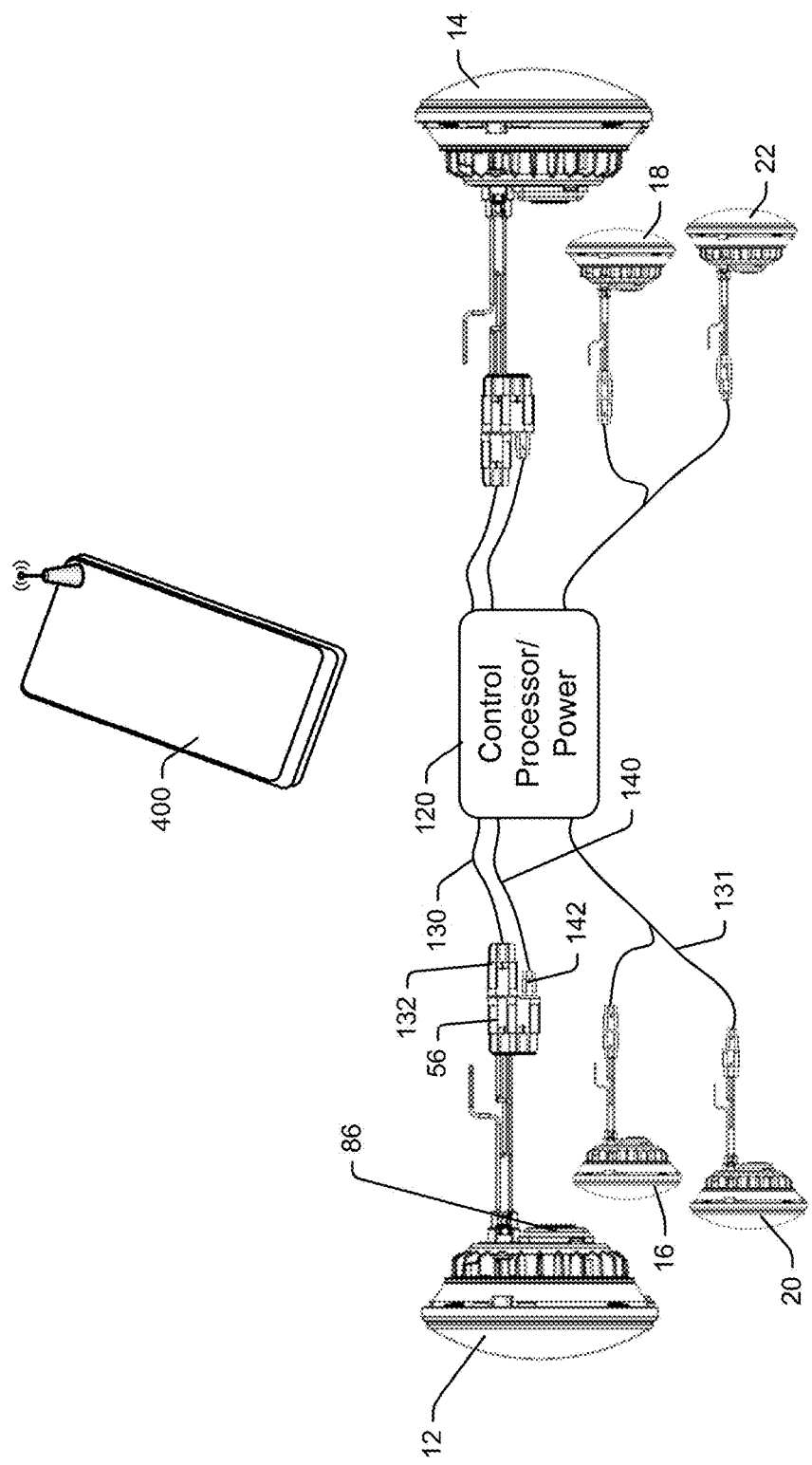
FIG. 18 shows a power and control linkage that is consistent with at least some aspects of some embodiments of the present disclosure.

Referring now to FIG. 18, to handle original equipment control signals and provide related functionality, headlight assembly 12 is provided with a multi-input connector 56 that can receive two or more original equipment control connectors. In FIG. 18 connector 56 at the end of the headlight assembly cable is shown as a dual input connector that receives each of the connectors 132 and 142 associated with the original equipment headlight control cable 130 and the turn signal cable 140, respectively. Thus, in FIG. 12, each of the headlight and turn signal control cables are fed through connector 56 to the single headlight assembly 12. A similar dual input connector is provided for the other headlight assembly 14 so that headlight and turn signal control cables are linked to that single assembly 14.

Referring still to FIG. 18 and once again to FIG. 13, control signals on cable 130 are provided to headlight assembly 12 to control the high and low beam LEDs and turn control signals on cable 140 are provided to assembly 12 to control LEDs associated with signature optic 45 so that the optic 45 blinks on and off with amber colored light when a driver is signaling that she is turning to the right. Similar signals for headlight control and turning are provided to headlight 14.

Referring again to FIGS. 16 and 17, because turn signaling is facilitated via replacement headlights 12 and 14, there is no need for the original equipment turn signal devices 116 and 118 (FIG. 11) and therefore, in FIG. 18 those devices are shown replaced by auxiliary fog light devices 16 and 18. To provide power to the auxiliary fog light devices 16 and 18, an original equipment fog light power and control cable 160 is spliced to divide the signal and power therein between original and auxiliary fog lights 20 and 16, respectively.

Supplemental control signals are not provided by an originally equipped vehicle and therefore have to originate from some source other than the control processor/power source 120. In at least some embodiments where a driver employs a portable smart computing device such as a smart phone, smart watch devices, etc., that is capable of WIFI or other wireless communication, the smart device may be programmed to provide supplemental control signals via the Bluetooth or other wireless transceivers (see 86 in FIG. 12) mounted at the rear ends of the assemblies 12 and 14. For instance, to control power to the lateral light pipe LEDs 610 and hence to control lateral light generation, exemplary smart phone device 400 in FIG. 18 may be programmed to enable a driver to turn the LEDs associated with the lateral light pipes on and off, to adjust light intensity, light color or temperature, etc. As another example, to control the LEDs associated with the signature optic 45 so that those LEDs and optic 45 operate as a day running light, phone device 400 may be programmed to provide on and off day running light options to a driver via the smart phone display screen and then control the signature optic LEDs appropriately or may be programmed to automatically turn on the signature optic LEDs whenever the associated vehicle is fired up. In other cases optic 45 may simply be illuminated any time the associated vehicle is fired up and may not require any control signal from phone device 400 to be turned on for that purpose.

Thus, in operation, original equipment lighting interface controls may operate in an identical fashion to facilitate original equipment lighting effects once replacement headlight assemblies 12 and 14 are installed, albeit controlling difference LEDs in the headlight assemblies alone. Other supplemental effects (e.g., not supported by an originally equipped vehicle) can be controlled via a smart phone or other smart device application program per direct user input to turn on and off or enable and disable different functionality.

In at least some cases it is contemplated that a smart phone or other smart device application program may, in addition to being useful for controlling supplemental headlight functions, be useful for other headlight related functions. For instance, exemplary functions may be as an aid or tool useful in installing a set of replacement headlights, as a programming tool for selecting driver preferences for headlight feature controls, as a programming tool to adjust headlight and other light device LED intensity, color or other operating parameters to meet personal preferences within a range of allowed values, for registering a headlight or other lighting devices with a manufacturer, for purchasing at least a subset of headlight functionality, for reconfiguring headlight control when other auxiliary light devices are added to an overall lighting setup, etc.

In at least some embodiments it is contemplated that a driver that purchases a set of replacement headlights that are consistent with the present disclosure may down load a headlight control application to her smart phone and may initially create a personal headlight control account to manage lighting functionality and other aspects of the headlight assemblies. Here, it is assumed that the driver has already installed a replacement pair of headlights 12 and 14 and other auxiliary lighting devices and that all are properly wired for power and control.

Figure 19:
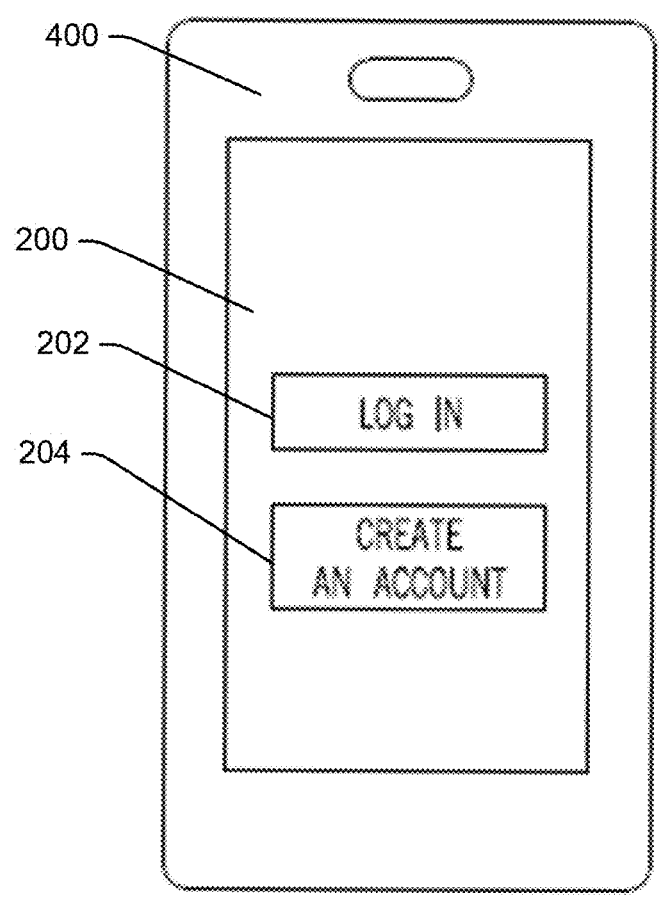
FIG. 19 is an image of a portable computing device that shows a log in screen shot that is consistent with at least some aspects of the present disclosure.

An initial screen shot 200 that may be presented to a driver that opens the headlight application program is shown in FIG. 19 and includes a "Log In" option 202 and a "Create An Account" option 204 which are selectable to log into the application if a user is already registered or to create a new account for headlight information and operational management. For this discussion it will be assumed that a user has to create an account and therefore that the user selects icon 204.

Figure 20:
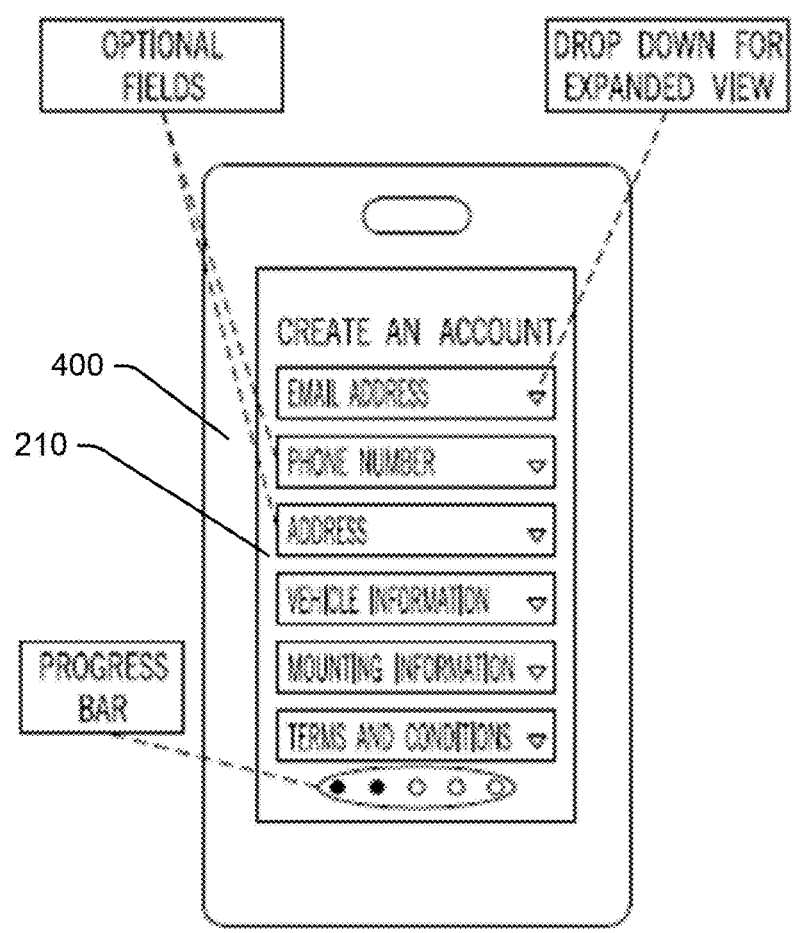
FIG. 20 is akin to FIG. 19, albeit showing another user interface screen shot that is consistent with at least some aspects of the present disclosure.

After icon 204 is selected, the screen shot 210 in FIG. 20 is presented to the user that includes several selectable icons useful in creating a headlight management account. Each selectable option has a drop down menu so that information related to the option can be accessed or fields can be provided for capturing driver, configuration and other information in an intuitive fashion. Many of the fields are optional and a progress bar is provided at the bottom of the screen shot to indicate the driver's location within the account creation process.

Figure 21:
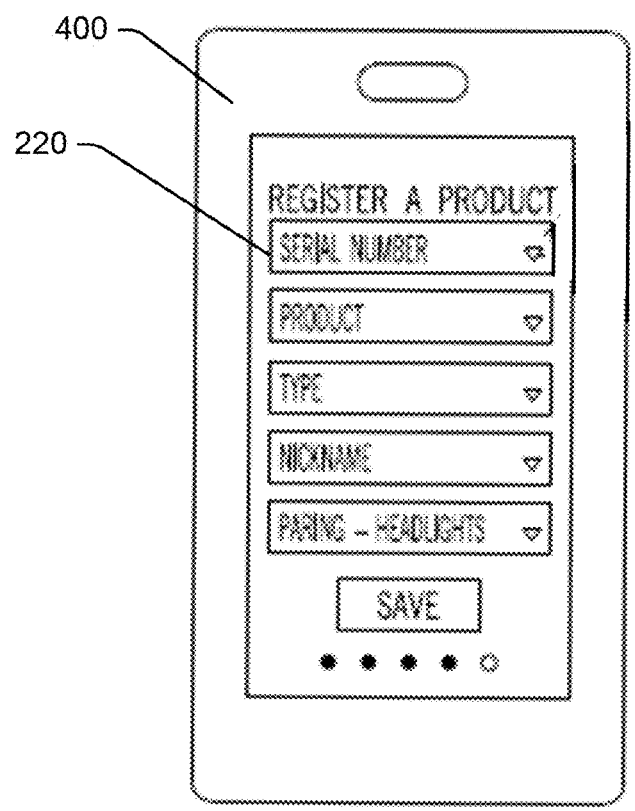
FIG. 21 is akin to FIG. 19, albeit showing another user interface screen shot that is consistent with at least some aspects of the present disclosure.

After a user creates an account, the user can then register a headlight assembly and/or other auxiliary lighting devices with a manufacturer, for warranty purposes, for replacement part purposes, for receiving and accessing alignment software tools, etc. In this regard, in at least some embodiments a product registration screen shot 220 as in FIG. 21 may be presented to a driver for selecting and accessing various tools that walk the driver through registering the product with a manufacturer or other warranty providing entity. Each product will have its own serial number which the user can enter manually, will have a product type and may be given a nickname that the user can easily remember (e.g., headlight assemblies, overhead auxiliary lights, etc.).

In some cases product data entry may be automated wherein a driver use's her smart phone device to pair with a headlight assembly setup or other lighting devices by entering device serial numbers manually or via phone device camera functions where the driver obtains an image of a bar code, matrix code, or some other code on the light device. Here, once paired, if the phone does not already have it, a headlight may transmit its unique product serial number, product type and other information to the driver's smart phone to be passed on to a system archive (e.g., in a remote server or the like). If a driver needs to register additional products that have not been registered prior, the driver simply continues to cycle through the product registration process once for each product to be registered until all products have been registered.

Figure 22:
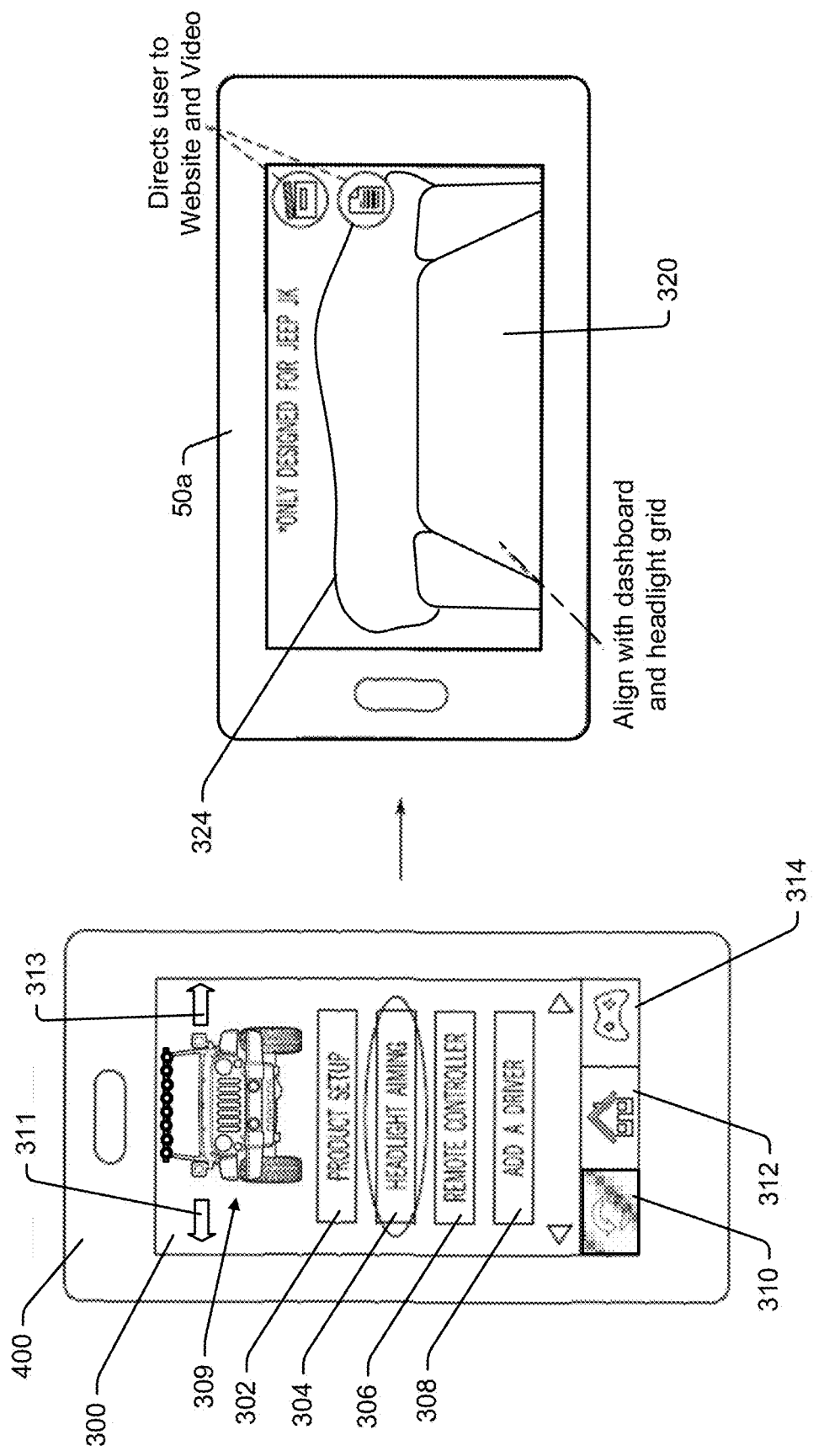
FIG. 22 shows a portable computing device at two different times that is being used as a headlight alignment aid in a way that is consistent with at least some aspects of the present disclosure.

In at least some cases once a new light device has been installed and registered, the application program may automatically set up product operating operations based on the product type. In at least some cases the application program will enable a driver to customize various operating parameters of an installed lighting system such as, for instance, LED subsets that are powered to generate specific user preferred light patterns as well as intensity and color of LED illumination which affects aspects of the associated light patterns. FIG. 22 shows a screen shot 300 that may be presented to a driver via a smart phone device 400 enabling the driver to set up lighting devices to operate as desired using product set up tools accessible via icon 302. Screen shot 300 includes an image 309 of a vehicle as currently configured in the application program. Arrows 311 and 313 allow a driver using device 400 to rotate the vehicle image to different orientations so that the driver can see the vehicle and lighting devices from any perspective (e.g., side, rear, etc.). As a driver adds light devices to her vehicle and registers those devices as associated with the vehicle, those devices may be added to the image 309 to show vehicle appearance as well as to show how those devices are programmed to operate during different operating modes.

In FIG. 22, a driver may select a headlight aiming icon 304 to access tools that enable the driver to precisely aim installed headlights to meet regulatory requirements. Screen shot 300 also includes a remote controller icon 306 and an "Add A Driver" icon 308 that will be described in greater detail below.

Referring still to FIG. 22, screen shot 300 also includes a navigation icon bar at the bottom of the screen that is persistently presented once products are registered in the system. The navigation bar includes a product set up icon 310 akin to icon 302 which is just another way to get at the same set up tools, a home page icon 312 that brings the driver back to the screen shot 300 as shown in FIG. 22 and a remote control icon 314 that is akin to icon 306. Left up to right cross hatching (see 310 in FIG. 22) indicates that an associated icon is currently selected so that information above the navigation bar is related thereto.

In the case of headlights, the driver may work through various tools designed to help the driver precisely aim installed light devices so that lighting effects are optimized for personal preferences and to meet regulatory requirements. In at least some cases video or text help icons (see upper left icons on the display of smart device 400a in FIG. 16) may be provided to a driver that can be selected to access a YouTube or other video or a text document including headlight alignment and adjustment instructions. To this end, in at least some cases, when a driver selects icon 304 on screen shot 300 (FIG. 22), a driver may be instructed to place her vehicle near (e.g., approximately 2 feet) and facing a flat vertical wall with its headlights on and in a specific operating mode (e.g., high beam mode). Next, the application program may access a camera application on the driver's smart phone so that a camera field of view is presented on the phone device display screen and may be instructed to align the smart device at a specific with respect to her vehicle (e.g., at a specific location and orientation on her vehicle's dashboard facing forward) to obtain images (e.g., through the vehicle's front windshield) at a specific angle so that the camera obtains a persistent view of the headlight light pattern on the wall adjacent the front end of the vehicle.

The lighting management application program may be programmed to help the user best align her smart phone camera with the wall that the vehicle faces by assessing juxtaposition of the camera with respect to the wall structure and may provide feedback to the user on angle adjustments until the camera is in an optimized location relative to the wall structure and light pattern thereon. For instance, the camera may be able to detect when it is parallel with the wall on which the light pattern is shown, may be able to capture a portion of the front of the vehicle (see right hand image in FIG. 22) and assess alignment therewith, etc. The application may present suggestions to the user for hunting for the right relative position between the camera and the vehicle. Suggestions may include a suggestion to move the camera forward or reverse, angle the camera more or less in any direction, etc. Suggestions may be textual, graphical, audio, and/or haptic (e.g., vibrate until an optimized juxtaposition with respect to the vehicle dash board is achieved).

In other cases, referring to FIG. 22 again and specifically the smart device 400a shown in the right side of that figure, the application program may present a silhouette 320 of a front of a vehicle of the same make and model as a driver's vehicle on the driver's smart device camera display screen and the user may be instructed to align the camera so that the silhouette is aligned with the front end of the driver's vehicle when viewing through the vehicle's windshield. The application may recognize features of the front end of the vehicle and match those with features in the silhouette as the user moves the smart device about near the optimal juxtaposition until the silhouette is aligned with the vehicle front end and may continue to provide suggestions to a rider as to how best to align the camera with the light pattern on the adjacent wall. In a similar way, the program may present a couple circles or other patterns that mimic particularly bright light patterns in the light emanating from the headlights and the program may instruct the driver to align those circles or patterns with the light patterns subtending the wall in front of the vehicle while the smart device is supported on a vehicle dashboard. Again, the program may provide suggestions for better pattern alignment either textually, graphically, audibly (e.g., voice commands, sounds, etc.).

In still other cases, the application program may be able to detect distance between the smart device and the wall on which the light pattern falls or detect differences in camera angle and may be able to compensate for those differences when assessing headlight alignment optimality.

Once the camera is properly aligned with the front end of the vehicle, the application program may either automatically obtain one or more images of the front end of the vehicle and the light pattern (see 324 in FIG. 16) on the wall in front of the vehicle or may confirm proper alignment and require user action to initiate image generation. Once an image of the headlight pattern is analyzed by the application program, the program may instruct the driver to manually adjust the angle of the headlight in any direction required to bring the alignment into regulatory requirements. Here, the user then manually adjusts the headlight brackets to adjust light device positioning and the process may be repeated until alignment is optimized.

In still other cases where a smart device can be supported on a camera dash board during an alignment process, the smart device may be programmed to recognize from a headlight light pattern when the headlight has been adjusted to a different position and may be programmed to continually compare the headlight pattern to an optimized pattern to assess how the headlight position should be adjusted to continue to move toward optimal positioning and may provide audible feedback to the driver during the alignment process. The audible feedback may be spoken (e.g., "Tilt right headlight further upward") or based on changing sound (e.g., pitch gets higher as the headlight alignment moves toward optimization). In this way, a device installer can be located at the front end of the vehicle adjusting the headlight alignment and still obtain feedback in real time from her phone or other smart device on how adjustments are affecting alignment.

In at least some cases it is contemplated that headlights that have to be installed and aligned so that low and high beam patterns and intensity meet regulatory requirements may only be fully functional after alignment is checked and verified per the smart phone or device application program. In these cases, for instance, the headlights may be turned on and controlled while an associated vehicle is parked so that one of the alignment processes described above can be completed but the headlights would not be completely functional until alignment is proper and checked via the smart device. Once alignment is confirmed, the headlights would be fully functional. In some cases the headlights may be partially operational while driving prior to alignment verification For instance, low beam mode may be operational or just low and high beam modes where high beam intensity is at the lowest possible high beam intensity that is within a range that is consistent with regulations. As another instance, only low and high beam modes may be functional and other modes including the lateral beam mode, the signature optic operation and other modes may be disabled until alignment is confirmed.

Once at least one and in many cases several lighting products have been installed as replacement or auxiliary lights and alignment completed, the driver can select lighting devices that are to be illuminated together such as, for instance, first and second headlight assemblies 12 and 14. Where other assemblies are to be wirelessly controlled via the smart phone device 400, other light devices to be illuminated together may be grouped together such as, for instance, multiple auxiliary lights installed on an A pillar of a Jeep Wrangler. Groups of devices may be nicknamed with names that are intuitive to a specific driver such as, for instance, "headlights", "A-pillar lights", "Off-Road Lights", "High Intensity Group", etc.

To control various lighting modes, the smart device 400 may operate as a remote control for headlight assemblies 12 and 14 as well as for other light devices registered with the system. To this end, see again FIG. 22 where driver can select the remote control icon 314 to access remote control tools where the smart phone device 400 operates as a remote control for various aspects of the headlight and other system light devices and assemblies.

Figure 23:
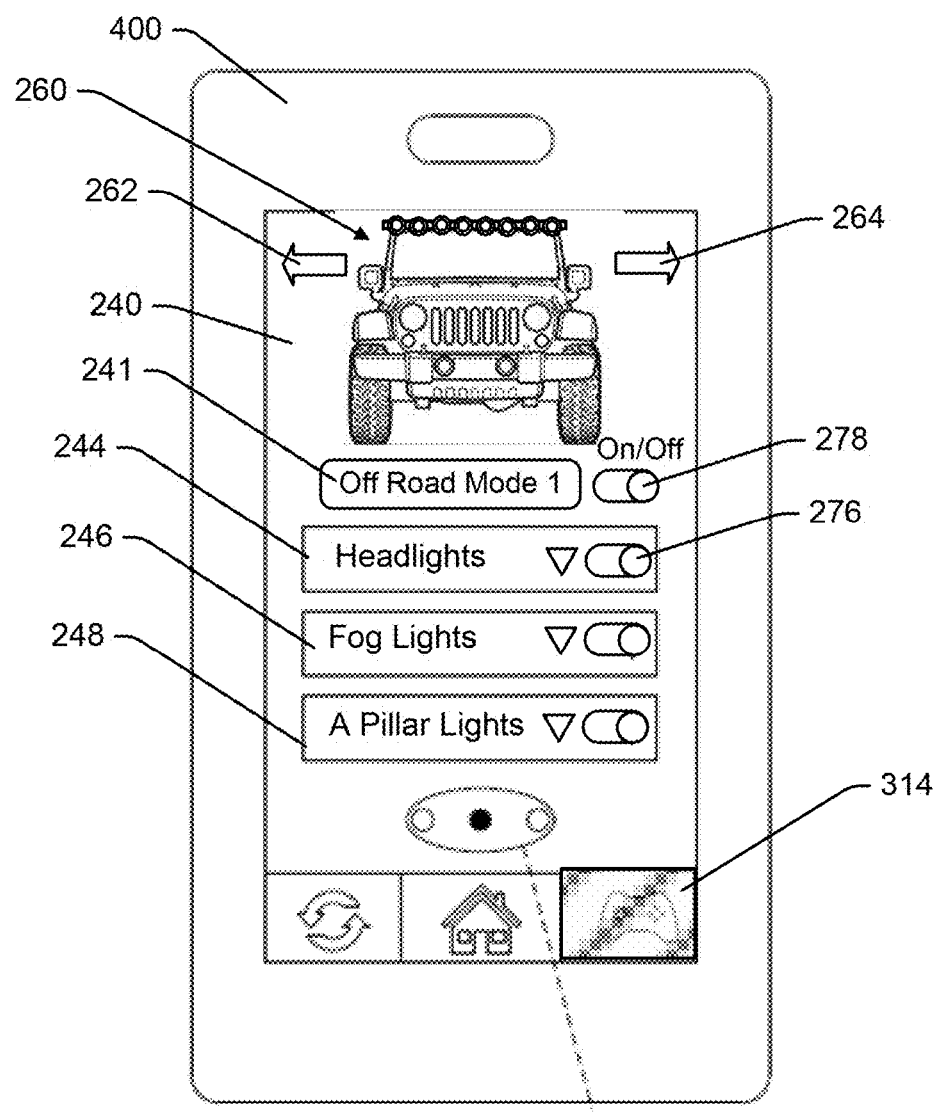
FIG. 23 shows a screen shot useable to access one lighting operating mode and tools for controlling lighting devices that is consistent with at least some aspects of the present disclosure.

In FIG. 23 icon 314 has been selected to enter a remote control routine and access remote control option tools via a screen shot 240. The remote control mode is only accessed once a smart device is associated with a specific vehicle and once accessed, the system presents an image of the vehicle at 260 that includes all of the registered light devices for the vehicle. The driver can select arrow icons 262 and 264 to rotate the image of the vehicle to see other views (e.g., side, rear) and registered light devices mounted to the vehicle.

Screen shot 240 also shows a mode title field at 241 and lighting group fields at 244, 246 and 248. In the present example, a driver has programmed the system with an "Off Road operating Mode 1" where the user has selected three different front facing light device groups including headlights, fog lights and A-Pillar lights to control together when driving off road. While not shown, other facing (e.g., left side, right side and rearward) light devices may be added to this operating mode. Each of the lighting device group icons 244, 246 and 248 is selectable to access a pull down menu to open up a pull down tool set for controlling the specific light device group.

Figure 24:
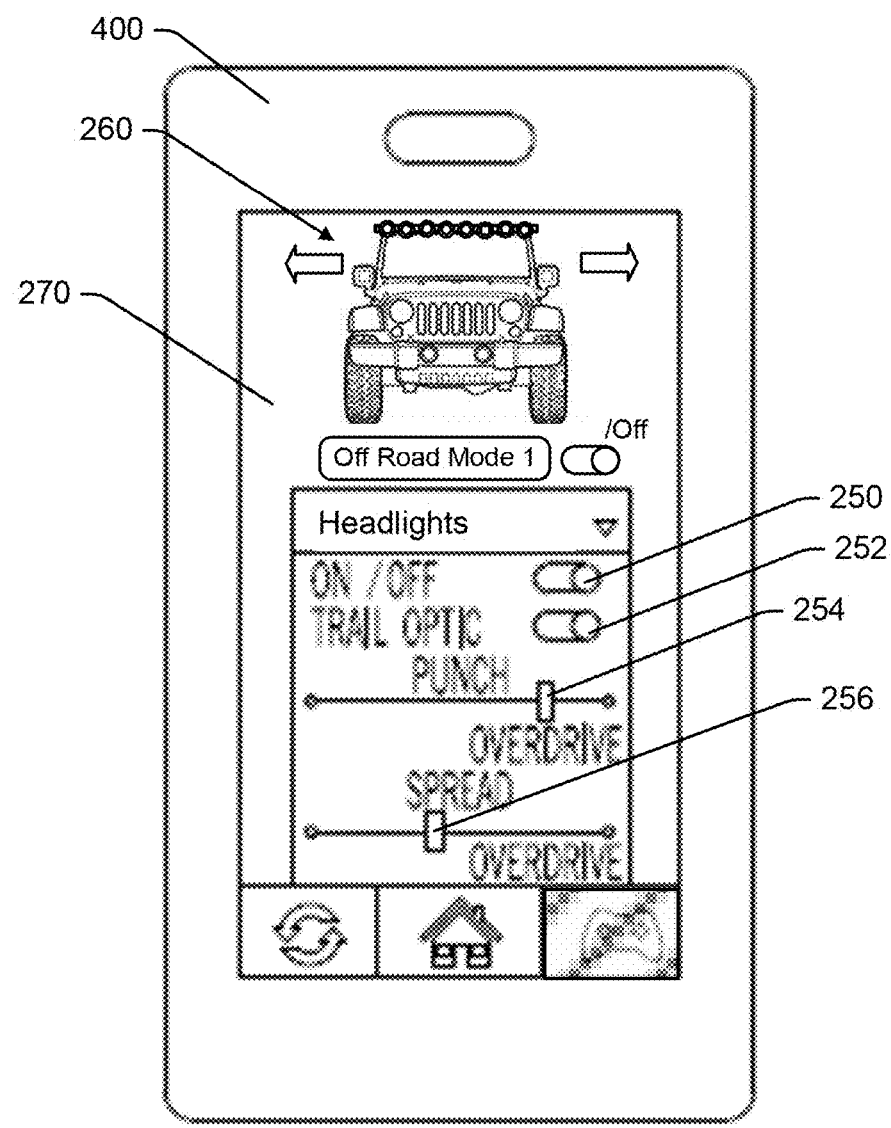
FIG. 24 is similar to FIG. 23, albeit showing a different set of lighting control tools.

FIG. 24 shows a screen shot 270 including the headlight group control tools and includes an on/off toggle button 250, a trail optic toggle button 252 and slider type range control tools 254 and 256 for changing the punch and spread characteristics of the headlight group. Here, the idea is that different ones of the LEDs on board 74 in FIG. 3 can be powered differently to change the light intensity and overall assembly light spread to customize light effects for specific drivers. Slider tools 254 and 256 are adjustable via sliding to change the light effects of the headlight group 12 and 14. As the driver changes the effects on device 400, the light devices in the image of the vehicle at 260 are illuminated to show the driver the effect of the changes. If the driver selects toggle button 252 to turn on the headlight lighting device group, the actual vehicle headlights can be controlled in real time in a fashion consistent with the driver selections via screen shot 270 so that the driver can experience the real world lighting effects first hand as well as see what the vehicle looks like in front plan-view via the representation at 260. In FIG. 23, the other group icons 26 and 248 may be selected to access other control tools for each of the other lighting device groups associated therewith.

Referring still to FIG. 23, a separate on/off toggle button (see exemplary button 276) is provided for each of the lighting device groups so that a driver does not have to access the associated pull down menu to get at the on/off toggle button associated therewith. Similarly, an on/off toggle button 278 is provided for the off road mode 1 so that a user can turn on all of the light devices per their current settings with a simple single button selection.

While the interface is described in the context of a single off road mode 1, the smart device interface may support many different modes which are independently accessible via the device display screen. For instance, second, third, fourth, etc., mode setting tools may be accessible by simply swiping left or right on screen shot 240 in FIG. 23 to bring up other modes and associated light device group drop down menus and control tools.

In at least some cases it is contemplated that more than one driver may use a vehicle and different drivers may have different lighting preferences off road and even when driving on road. For this reason, in at least some embodiments it is contemplated that different drivers may set up different accounts for controlling lighting devices in the same vehicle. In at least some embodiments, after a first driver sets up an account for a specific vehicle, a second account will only be able to be set up if the first driver associated with the first account authorizes a second driver to set up an account and personal preferences. In some cases authorization will take the form of an e-mail from within the lighting control application program from the first user to the second user inviting the second user to set personal preferences.

Figure 25:
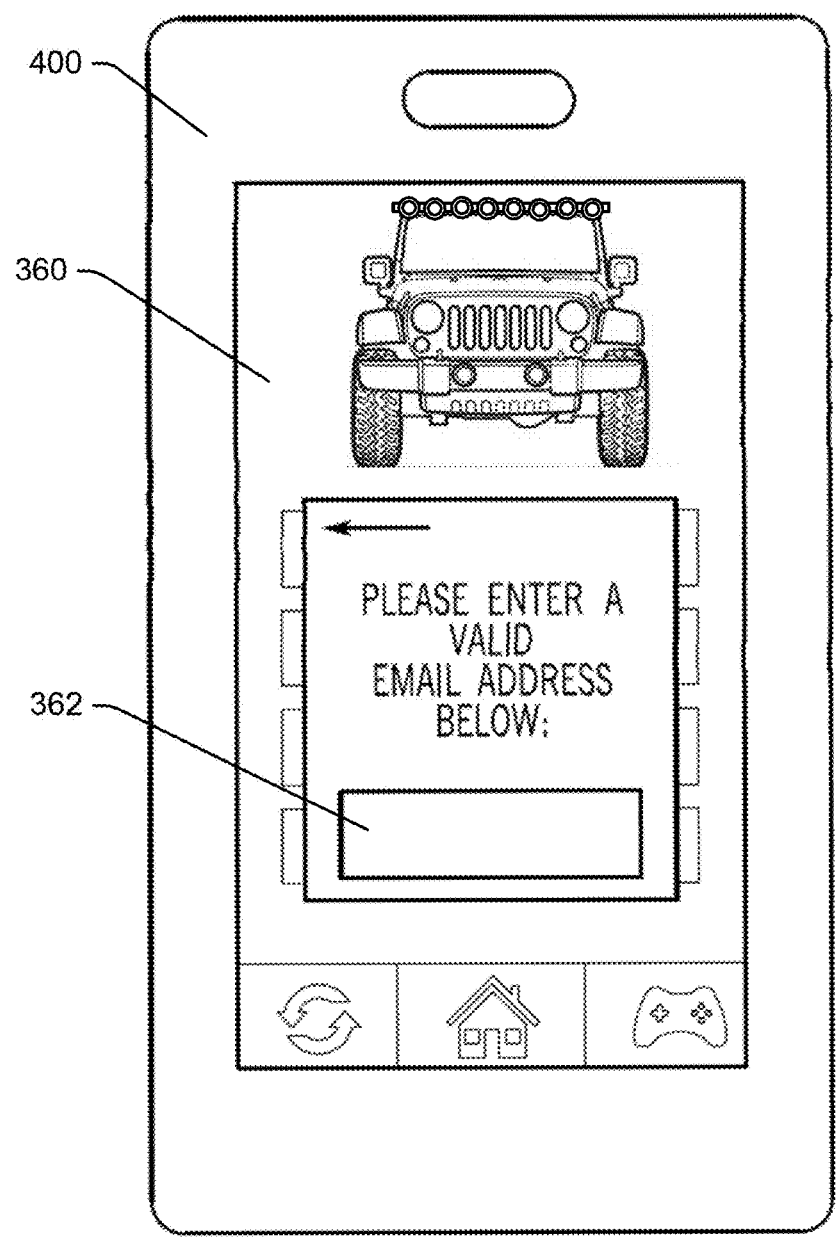
FIG. 25 shows a screen shot useable to send an e-mail to a second driver to invite that driver to configure her phone device for lighting control.

Referring again to FIG. 22, to invite an additional driver to set up lighting control preferences on his smart phone device for a vehicle, the first user selects the "Add A Driver" icon 308 which brings up the screen shot 360 shown in FIG. 25 inviting the first user to enter a valid second driver's e-mail address into an address field 362. Once the second driver's e-mail is entered into the address field 362 and the invite is sent, the second driver receives an e-mail invite to download the lighting management application which is automatically associated with the vehicle already associated with the first driver that set up the initial account and sent the e-mail. The second driver can step through screen shots as described above to set customized headlight and other light device settings. Here, the second driver's settings will be associated with the second driver's phone or other smart computing device.

Upon initially starting a vehicle, light settings will, in at least some cases, be set to default settings that support high and low beam light operating modes and turn signaling where original equipment control mechanisms (e.g., a pivoting and/or rotating light control arm member) are useable to control original equipment lighting functions. Here, the initial lighting functions may include headlight signaling and headlight day running light functions if those are programmed, again, where those operating modes are controlled by the original equipment control mechanisms. To control any other functions in addition to functions associated with the original equipment control mechanisms, the driver would have to use her smart computing device to wirelessly provide control signals to the light devices.

In cases where two or more driver's have different light device preference settings that are associated with different smart devices, when a vehicle is turned on, the vehicle may automatically identify a smart device that is located within the vehicle and may set preferences (e.g., both light device functions based on original equipment control mechanisms as well as functions that have to be controlled via the user's smart device) associated with that specific smart device as opposed to other smart devices previously associated with the vehicle. In cases where two associated smart devices are located in or proximate the vehicle upon ignition, the system may automatically identify presence of more than one associated smart device and present an option for a driver to select one of the proximate devices and associated settings for light control. Here, the option may be presented via an on vehicle display screen (e.g., see 406 in FIG. 27), via one of the proximate smart devices or via each of the proximate smart devices. Where no associated smart devices are proximate a vehicle upon ignition, the default lighting functions or modes would be operational.

After customized settings are set for vehicle light devices, the next time a driver wants to use the lighting management program to control the vehicle lighting devices, immediately upon opening the application and logging on (see 202 in FIG. 13) using the driver's smart device, the driver is taken to the remote control screen shot 240 as shown in FIG. 23 where the driver can control any and all devices that are associated with the overall lighting system.

As described above, there are regulations regarding light patterns and intensity that can be used for low and high beam on road driving. In at least some cases off road light patterns and intensities from headlights or headlights and auxiliary light groups or combinations will far exceed on road regulations. In at least some embodiments the light control system may only enable off road light patterns and intensity when a vehicle is off road. To this end, see again FIG. 5 where headlight 12 includes a location sensor 89 which can detect headlight and hence vehicle location using GPS or other location tracking systems. Here, when processor 85 detects that a vehicle is on road, the processor may disable off road light patterns and intensities so only on road operation occurs. In other cases where a user uses a smart phone 400 to control various headlight and auxiliary light functions, the smart phone location tracking feature may be used to disable off road light patterns and intensities when a vehicle is on road.

In still other cases off road lighting patterns that are inconsistent with on road regulatory requirements may only be enabled after a driver is presented warnings about on use regulations and that the off road settings cannot be used on road. Here, the warnings may be presented to the driver via a smart phone display screen or the like and may require the driver to verify that she read and understands the warnings and possible consequences of using light capabilities in ways that are inconsistent with regulations.

In some cases a user may set up her system so that whenever her vehicle is off road, headlight and other device control automatically defaults to off road light patterns so that the driver has to adjust control to present other patterns when desired. In addition, where light devices are controlled to form off road light patterns, when the vehicle is driven onto a road, a system processor may recognize the on road state and either automatically change the light pattern and control functions to be consistent with on road requirements or may present a warning to the driver that the light settings or mode should be changed to an on road mode. In either case where location based on road or off road light control is automatic, the driver may have the option to override that setting when desired.

In at least some cases it is contemplated that other headlight assemblies with other functionality may be provided where a driver can program different light patterns and intensities based on other vehicle operating parameters. For instance, some headlight devices can steer a headlight pattern left and right as a vehicle negotiates left and right turns, respectively. Where headlight steering is an option, additional orientation, roll, pitch, etc., sensors (see 91, 93, 97 in FIG. 5) in the headlight may be used to detect turns or other vehicle machinations used by processor 85 to adjust light patterns and intensities. Here, in at least some embodiments a driver may program more or less headlight pattern steering using smart device 400. Other headlight functions and features are contemplated that may be programmed using device 400.

Referring again to FIG. 5, other vehicle light devices may be equipped with wireless transceivers so that they can be at least programmed to operate in customized ways while still operating within regulatory limitations. Thus, for instance, a turn signal light device 316 may have a wireless transceiver so that it can be programmed to blink at a customized rate, to adjust light color within options that are consistent with regulatory requirements, etc. Other instances include fog light 20 and a brake and tail light assembly 32 as also shown in FIG. 5.

In at least some embodiments other vehicle mounted light devices may be designed for operation that is outside regulatory limits for, in particular, off road use, where a wireless transceiver within the light assembly enables customized programmed control of light operation. To this end see for instance the exemplary enhanced taillight assembly 560 shown in FIG. 28 that may be used to replace an original equipment taillight on a Jeep Wrangler. While FIG. 28 only shows side, plan and bottom views of the exemplary taillight assembly as well as exemplary light patterns generated by different versions of the assembly, it should be appreciated that other components shown in FIG. 5 and described as being located with the headlight assembly 12 may also be included in the taillight assembly including but not limited to a processor, a memory and one or more senor devices so that light operations may be controlled in part as a function of sensed vehicle conditions, location, orientation, etc.

Figure 28:
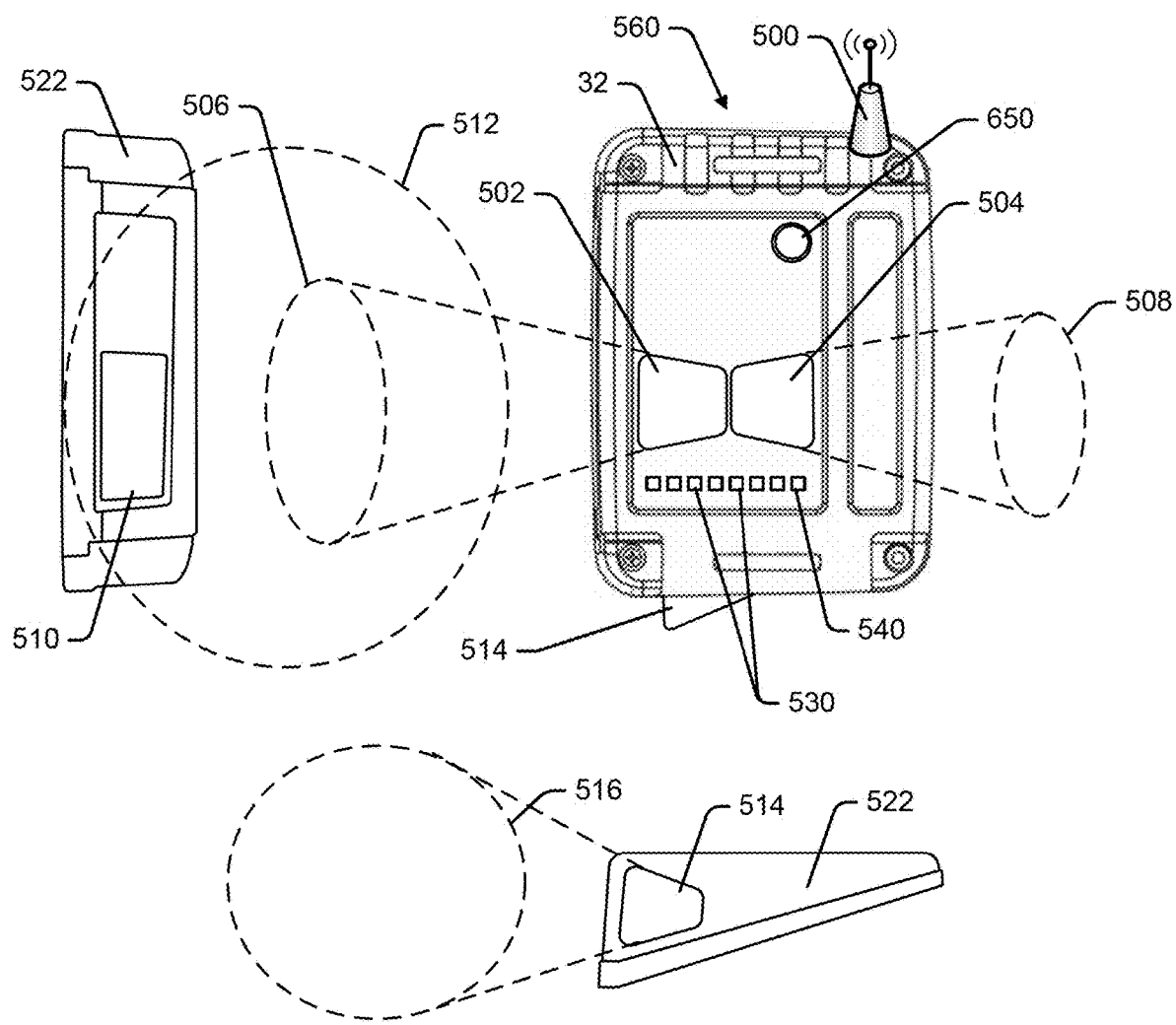
FIG. 28 is an illustration showing different views of a tail light or rear vehicle lighting assembly that are consistent with at least some aspects of the present disclosure.

In addition to including conventional taillight light devices and optics that function to provide reverse lighting, turn signal lighting and a taillight which are not detailed in FIG. 28, the FIG. 28 tail light assembly 32 is shown to include several different lateral light optics and would include one or more LEDs for each of the light optics included in the assembly. For instance, a first lateral light optic 502 is shown that is generally rear facing and that generates a lateral light beam pattern 506 on a lateral side of the vehicle that assembly 32 is mounted to. So, for instance, when assembly 32 is mounted to the left side of a vehicle, pattern 506 is projected laterally left and to the rear of the vehicle.

Referring still to FIG. 28, a second lateral optic 504 is shown that is generally rear facing and that generates a lateral light beam pattern 508 on the lateral side of the vehicle opposite the side that assembly 32 is mounted to. So, for instance, when assembly 32 is mounted to the left side of a vehicle, pattern 508 is projected laterally right and to the rear of the vehicle in a fashion similar to the way that the headlights described above project lateral beam patters across a centerline of the vehicle. The optics 502 and 504 are provided on the sides of assembly 32 to which the light patterns generated by each are directed (e.g., left shown optic 502 directs light pattern 506 to the left and right shown optic 504 directs light pattern 508 to the right as shown. In other embodiments the left optic 502 may direct a light pattern to the right and/or right optic 504 may direct a light pattern to the left.

Referring again to FIG. 28, as shown, taillight assembly 32 stands proud of the vehicle surface that it is mounted to and therefore assembly 32 includes a generally downward facing surface 520, a lateral or side facing surface 522 and an upward facing surface (not illustrated). A side facing lateral optic 510 is shown formed in side facing surface 522 and a separate LED (not shown) would be aligned with optic 510 to project another lateral or side light pattern 512. Similarly, a generally downward facing lateral optic 514 is formed in the downward facing surface 520 that projects yet another lateral or side light pattern 516. Optic 514 is shown standing proud of bottom surface 522 in FIG. 28 but may also be flush with surface 522 is some embodiments. A second taillight assembly mounted on a second side of the rear of a vehicle would include similar lateral optics and corresponding LEDs.

While FIG. 28 shows several lateral or side light patterns 504, 508, 510 and 512, some embodiments may only include optics and LEDs to generate one of those patterns or any subset of those patterns. In addition, in at cases where assembly 32 includes two or more of the lateral light optics, the light patterns generated by the optics may overlap entirely, overlap somewhat or may project light patterns that align generally at their edges so each pattern fills a different portion of a field of view with light. Similarly, the lateral light patterns from the left and right taillight assemblies may be designed to overlap substantially, partially or essentially not at all.

Referring yet again to FIG. 28, in at least some embodiments light assembly 32 may come equipped with a first subset of reverse LEDs 530 and an auxiliary subset of reverse LEDs 540. In FIG. 28 assume that the first subset includes only two of the 8 LEDs shown that are labelled 530 and that the other 6 LEDs comprise the second auxiliary subset, only one Labelled 540. In the case of many vehicles, the light intensity of reverse light devices is insufficient to meet user preferences. Here it may be assumed that the first reverse set 530 includes LEDs that generate light with a standard light intensity while the other 6 LEDs 540 increase the reverse light intensity substantially (e.g., by 1000%). When assemblies 32 are sold they may come programmed to only use the two LEDs in subset 530 for reverse light and a user may be able to use her smart phone or other device to reprogram the tail light assemblies to generate higher intensity reverse lighting. In some cases the intensity may be variable to any intensity level within the possible range to suit user preferences. In other cases the intensity may only be able to be at the standard level or the maximum level possible. In other cases assemblies 32 come with the standard intensity light programmed and a driver may have to purchase the ability to increase the reverse light intensity using a smart phone device application or the like as an interface. In addition to changing intensity by illuminating different subsets of the LEDs, in other cases intensity of reverse light LEDs may be adjusted by simply controlling the current level within one or a set of reverse LEDs.

Figure 29:
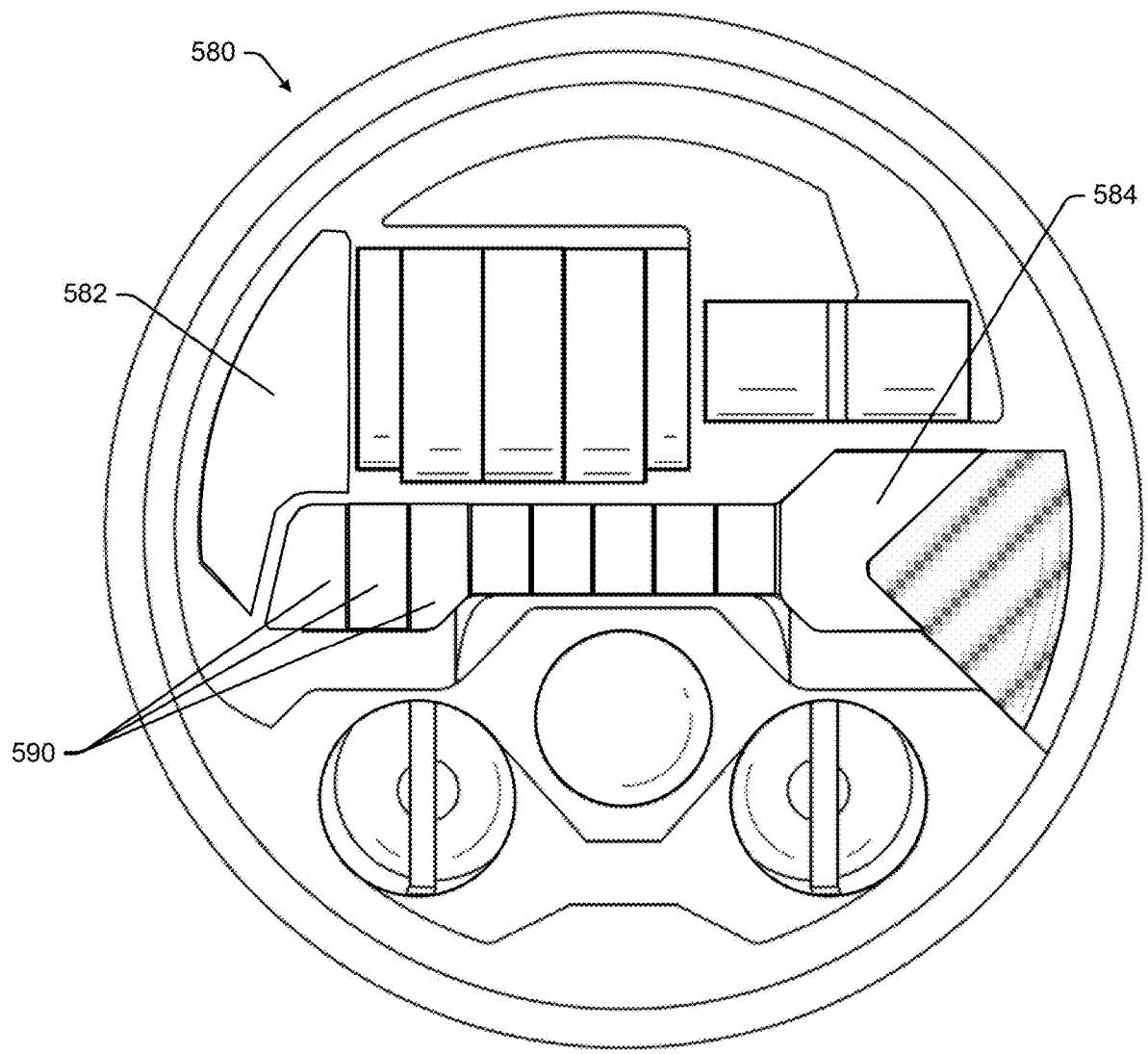
FIG. 29 is a front plan view of another headlight assembly that is consistent with at least some aspects of the present disclosure.

FIG. 29 shows yet another headlight embodiment 580 that is similar to the FIG. 6 embodiment 12, albeit where the signature optic 45 includes two end parts 582 and 584 as well as separate optic members collectively identified by numeral 590 that form the central portion of the signature optic shape. Here, it is contemplated that LEDs behind each of optics 582, 584 and 590 may be illuminated to generate similar color and brightness effects to provide a day running light or a blinking turn signal effect but other LEDs associated with the central optic member 590 may be illuminated at other times to provide additional lighting effects including higher intensity high beam patterns, additional lateral light patterns, etc. In addition it is contemplated that a driver may be able to program assembly 580 to create customized effects using LEDs associated with optics 590.

In still other cases the optics 590 may each generate light in a different section of a horizontal light pattern so that by controlling the intensity of the different LEDs associated with optics 590 separately, different patterns of light are generated. Here, an assembly processor may be programmed to adjust the LED intensity associated with each of the optics 590 dynamically as a function of sensed vehicle operating characteristics like pitch, roll, orientation, etc. using signals from headlight sensors 91, 93, 97 as shown in FIG. 4. Again, any functionality that light assembly 580 is capable of implementing may be programmed by a driver using a smart device or a wireless controller integrated into a vehicle assembly.

While not shown, in at least some embodiments the lighting management application program run on device 400 may also enable a user to program start and stop lighting sequences or effects. To this end, for instance, referring again to FIG. 6, just headlight 12 includes many LEDs and related optics. In some cases when a vehicle is initially turned on, the headlight may "come alive" by cycling through and blinking each LED on separately for a fraction of a second in rapid succession prior to settling on running functionality. As another example, all LEDs in a headlight may pulse on and off three separate times when a vehicle is turned on. Many other headlight ignition or start lighting sequences are contemplated. Some start sequences will be pre-defined and user selectable via a smart device 400 in a manner similar to that described above and, in at least some cases, a user may be able to customize headlight starting sequences.

In addition to enabling headlight starting sequences, where other fog light and auxiliary light devices are programmable, start sequences may also be specified for those other light devices. For instance, where headlight LEDs all pulse on and off three consecutive times each time a vehicle is started, A pillar light devices and fog light devices may similarly pulse on and off three times upon vehicle starting. Stop lighting sequences akin to the start sequences are contemplated where each may be predefined or customized and saved by a driver.

In at least some embodiments it is contemplated that drivers may be able to buy additional functionality via an on line application store for their headlight and other lighting assemblies. For instance, when headlight assemblies 12 and 14 are initially purchased, they may come with basic high, low and lateral beam operating modes where the signature optic LEDs are not enabled. A driver may purchase the right to enable the signature optic LEDs for day running lights, to operate as turn signals, to enhance start and stop lighting sequences, etc. Other headlight function purchases may include specific start and stop lighting sequences and others.

In at least some cases it is contemplated that LEDs in addition to those provided for low and high beam operating modes may be mounted on board 74 (see again FIG. 4) at locations that are aligned with high and low beam optics where those devices can be powered during off road activities to further increase light intensity when desired. For instance, while a single LED 612 is located behind high beam optic lens 71 in FIG. 6 that is illuminated along with other LEDs behind other lenses to generate an on road high beam light pattern and intensity, additional LEDs 372 and 374 may also be located behind lens 71 that can be activated to increase light intensity of light emanating from lens 71 during off road activities. Here, original equipment control signals would be used to control LED 612 and a user's phone or other smart device would be used to activate LEDs 372 and 374. While not shown, many other additional LEDs may be provided for off road operation behind one, a subset or each of the other optic lenses in FIG. 6.

In at least some embodiments a camera 380 (see again FIG. 6) may be included in one or each of the headlight assemblies 12 and 14 where the camera(s) operates in conjunction with a driver's smart phone 400 or other smart device to perform various functions. For instance, camera 380 may be used during a headlight alignment process wherein images of a light pattern on a wall adjacent the front end of a vehicle are analyzed to assess proper alignment and to provide feedback to a driver via the driver's smart phone on an on vehicle display screen (e.g., an centrally mounted user interface display common on many vehicles) as to how to adjust the headlights for proper alignment. As another instance, camera 380 may link to a user's smart phone 400 and provide real time video to the phone device 400 that can be presented on a device display screen to a driver. The smart phone 400 or a headlight processor may process incoming images and identify dangerous conditions and may present warnings to a driver via the driver's smart phone or some other Bluetooth enabled type on vehicle device. For instance, when driving too close behind another vehicle, the smart phone may present a warning or a suggestion to back off the vehicle.

The headlight assemblies 12 and 14 may take many different forms. For instance, the illustrated headlights in this specification include 7 inch round light assemblies. Other assemblies contemplated include 5 ¾th inch round assemblies, rectangular 4 by 6 inch and 5 by 7 inch assemblies and others that are standard sizes and shapes that are suitable for replacement purposes.

Figure 26:
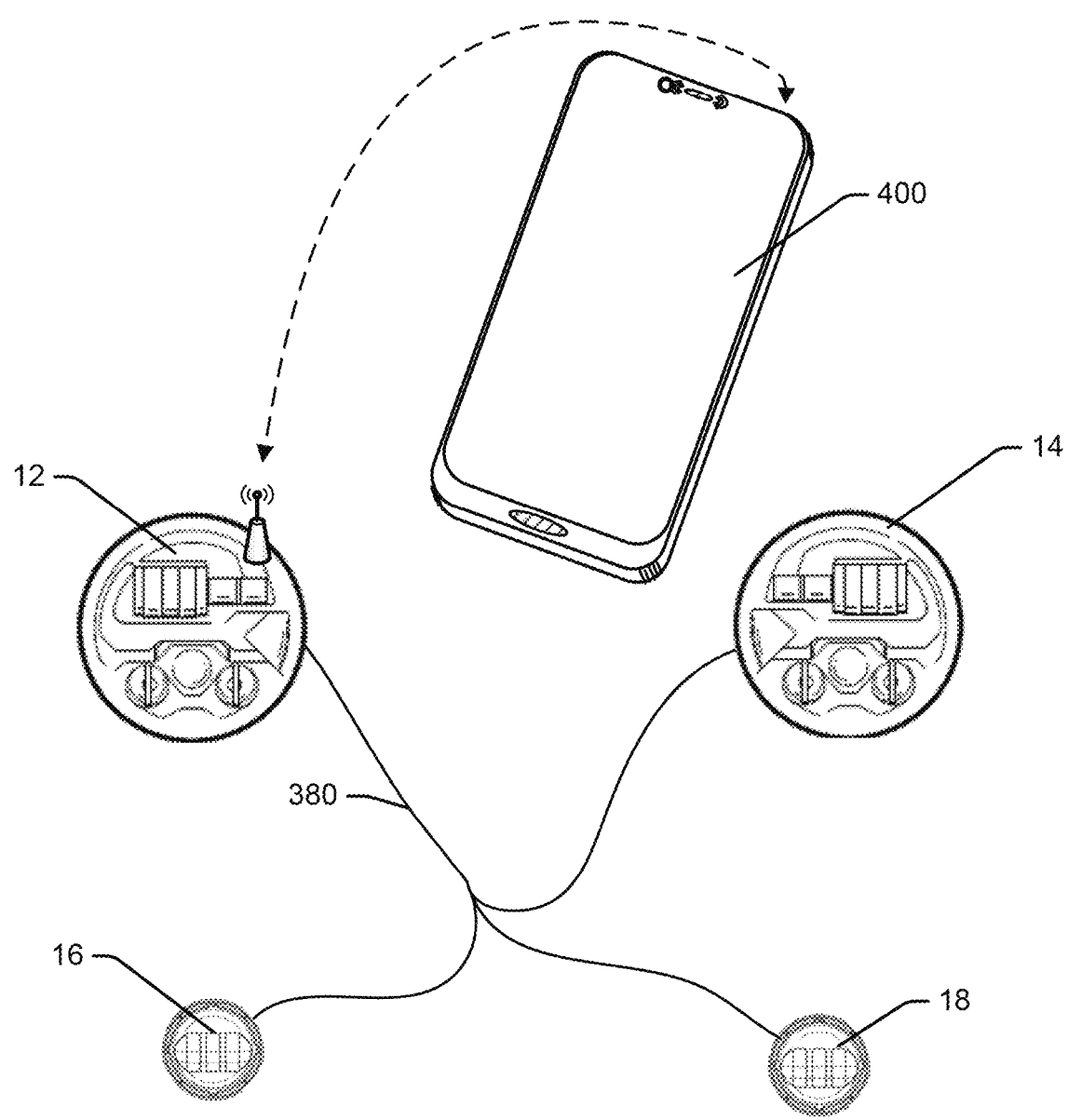
FIG. 26 is a schematic that shows a light system including four light devices where only one of the light devices includes a wireless transceiver for communicating with a portable computing device and where other light devices are linked to the one light device to receive control commands therefrom.

While each headlight assembly 12 and 14 and some or each of the other light assemblies included on a vehicle may have its own Bluetooth or other wireless transceiver for communicating with a driver's smart phone 400, in other cases it is contemplated that a single light assembly may be provided with a Bluetooth wireless transceiver and a hardware wire network may be provided to link the single assembly to other light devices for control purposes. To this end, see for instance the system in FIG. 26 that includes first and second headlight assemblies 12 and 14 and first and second replacement fog lights 16 and 18 where only assembly 12 includes a wireless transceiver 382 and where simple control wires 380 are link headlight assembly 12 to each of other assemblies or devices 14, 16 and 18. Here, each of the light assemblies may have a network specific digital address and a processor in device 12 may be programmed to transmit assembly specific control signals to the other light assemblies for control purposes.

To be clear, while most embodiments described above are described as being used with a smart phone device, the smart phone device may be replaced by any suitable other smart portable computing device such as, for instance, a smart watch 404 (see FIG. 27) or other wearable smart portable computing device. In addition, in cases where a vehicle comes with a computing system that supports Bluetooth wireless communication within a vehicle, that can have application programs loaded into a memory device, and that has a suitable user interface, all of the functions performed by the smart phone device 400 described above may instead be performed by the on board vehicle system. To this end, see for instance FIG. 27 where an in vehicle entertainment system 402 is shown which includes a touch sensitive display screen 406, a processor 408, a memory device 410 and a Bluetooth or other wireless transceiver 412. Here, a lighting management application program may be downloaded to memory 410 and run by processor 408 to program lighting functionality and to control that functionality thereafter in various ways. In cases where a headlight includes a camera, images or video from the camera may be presented to a driver via in vehicle display screen 406.

While the invention may be susceptible to various modifications and alternative forms, specific embodiments have been shown by way of example in the drawings and have been described in detail herein. However, it should be understood that the invention is not intended to be limited to the particular forms disclosed. For example, to be clear, in at least some embodiments any light assembly LED light sources may be controlled to adjust light intensity, color and any other light pattern characteristic to meet user preferences for off road light patterns or user preferences for on road patterns that are within regulatory requirements. In some cases even any off road light patterns that can be specified by a driver may be limited to meet on road requirements so that a driver does not inadvertently set light pattern modes that violate regulations.

Referring again to FIG. 18, in some embodiments when a turn signal connector plug 142 is linked to the dual connector 56, the processor within headlight assembly 12 may automatically be programmed to use signals on line 140 to control LEDs (e.g., in some cases, the signature LEDs associated with signature optic 45) in assembly 12 to provide turn signaling functionality. In other cases where plug 142 is not connected to connector 56, the assembly 12 processor may default to some other control mode (e.g., day running lights) for the LEDs associated with the signature optic 45. In some cases the LEDs associated with the signature optic may glow white any time a vehicle is on and there is no turn signaling and may glow amber when blinking to indicate turn signaling.

Figure 27:
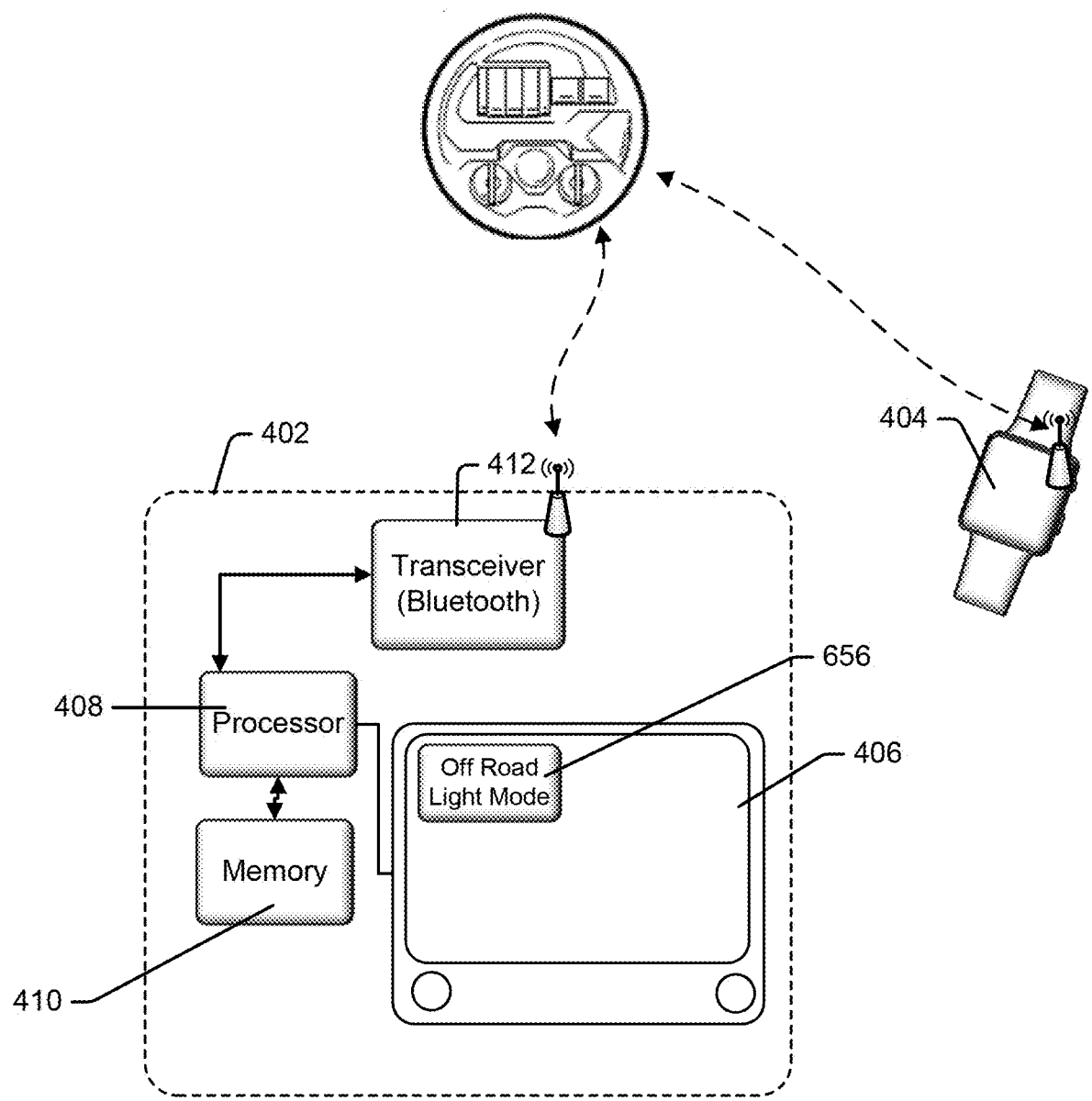
FIG. 27 is a schematic diagram that shows other user interface devices that can communicate via wireless communication with a headlight assembly and other lighting devices.

Referring again to FIG. 28, in at least some embodiments a camera 650 may be integrated into a rear tail light assembly 560 which can be linked wirelessly to a user's smart device or to an on vehicle display 406 that comprises part of an entertainment system (see again FIG. 27). In this way, the wireless transceiver 500 may serve dual purposes of enabling light control and management as well as providing a wireless capability to provide a vehicle backup video function.

In at least some cases it is contemplated that a smart phone or other smart computing device may be useable for programming user lighting preferences but that all or at least some in use control light device control may be via on vehicle control devices or systems so that after programming, a driver does not have to have her smart computing device present or associated with her vehicle to control the programmed functionality. Thus, for instance, in at least some cases after a driver programs preferred on and off road light control modes as described above, any control modes that cannot be selected via original equipment control mechanisms on the vehicle, can be controlled via a set of light control icons presented on the on vehicle display 406. Thus, for instance, an off road icon 656 may be presented on display 406 for user selection. Other mode icons may also be presented on display 406 as well as other light device control tools.

Instead of providing control icons on an on vehicle screen as in FIG. 27, in other cases it is contemplated that a simplified flat panel control device that includes a touch sensitive display screen, a processor and a transceiver may be provided with a headlight set or for separate purchase for use with a headlight set and other lighting where that device could be affixed somewhere on or adjacent a vehicle dashboard and used to control lighting devices in a manner similar to that described above.

In still other embodiments a mechanical control switch device may be provided as a light device control mechanism that mounts within a vehicle as another option for light control that does not require that a user has her smart computing device present after programming. Referring to FIG. 31, an exemplary mechanical switch device 660 may include a wireless transceiver 662 for transmitting control signals to headlight and other system devices for selecting light modes and light pattern characteristics. For instance, the mechanical switch device may including a rotating knob 660 that has four détente positions including an on road position and first, second and third off road positions. In this case, when knob 660 is in the on road position, the original equipment mechanical control devices would control system headlights and other light assemblies to provide high and low light beam modes, turn signaling and other conventional light modes. When the knob is in one of the off road positions, wireless signals transmitted from the knob to the system light devices would change the operating mode to the associated off road mode and control the separate light device LEDs accordingly. Other mechanical light control devices are contemplated such as, for instance, a push button control device that cycles through 4 different control settings with consecutive button pushing activities to select between on road and three different off road operating modes. Again, here, a smart computing device may be required to define the different light operating modes but once that is completed, the vehicle dedicated push button control could be used for control purposes.

Figure 30:
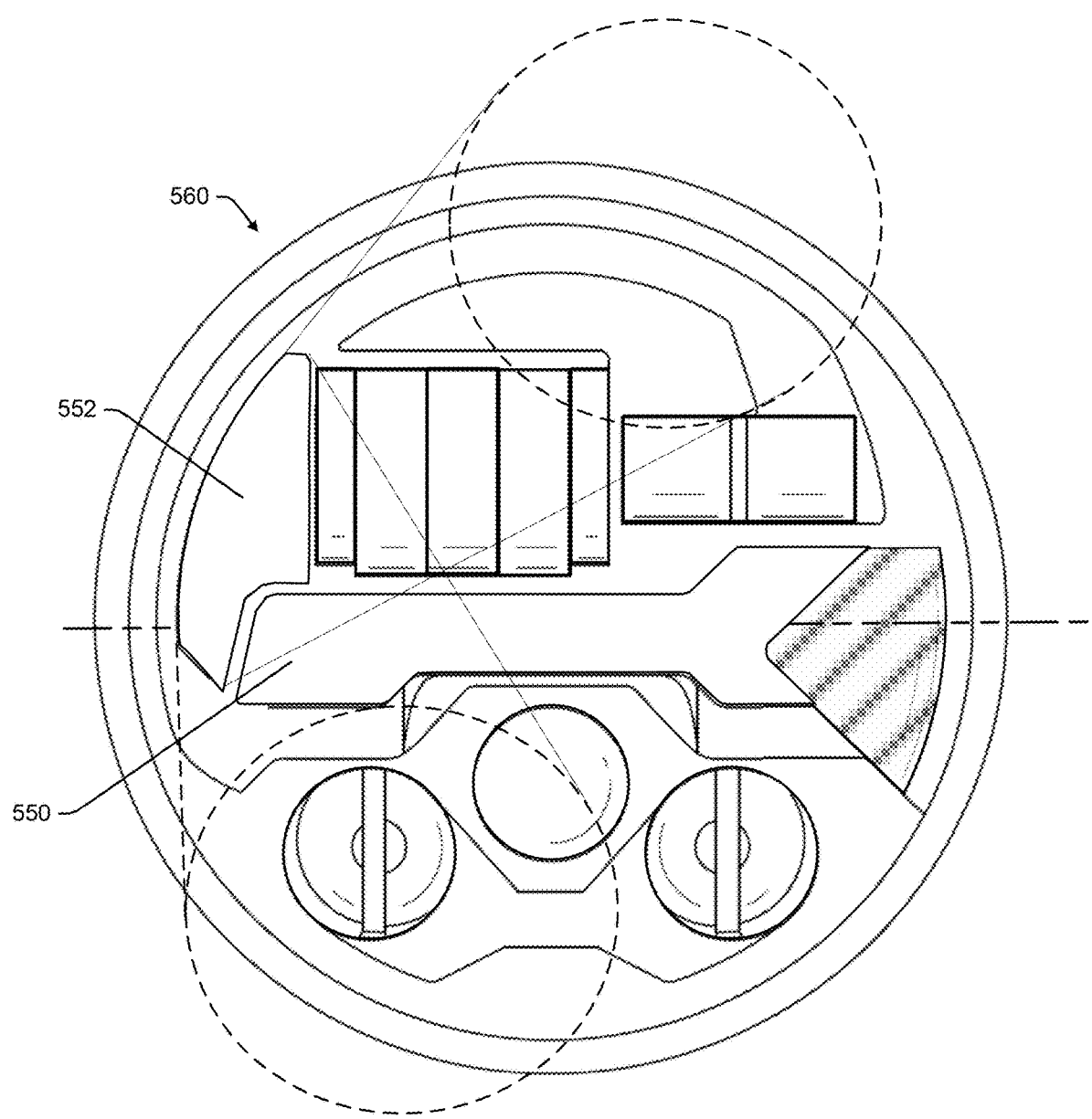
FIG. 30 is a front plan view of yet one more headlight assembly that is consistent with at least some aspects of the present disclosure.

FIG. 30 shows yet another headlight assembly 560 that includes, in addition to many of the components described above, a projector type lighting subassembly 552 which is controllable to, in effect, project a pixelated light pattern as known in the art where the pattern is more defined. Here, a driver may be able to define other useful off road or even on road light patterns that the specific driver prefers.

Although not shown, in still other cases it is contemplated that a headlight connector plug may include three or more connector assemblies so that more than two original equipment light connectors can be linked to a single headlight assembly to support even more lighting functionality within the single headlight assembly. Thus, for instance, referring again to FIG. 18, in a case where LEDs and associated optics within headlight assembly 12 also can be controlled to provide a fog light lighting pattern, connector 56 may be a triple connector that connects to each of cables 130 and 140 for headlight and turn signal control as well as to a fog light cable 131 for receiving fog light control signals from the originally equipped vehicle.

Thus, the invention is to cover all modifications, equivalents, and alternatives falling within the spirit and scope of the invention as defined by the following appended claims.

To apprise the public of the scope of this invention, the following claims are made:

The invention claimed is:

1. A remotely controllable headlight assembly for use on a vehicle, the assembly comprising:
   a circuit board including a plurality of LEDs including at least a first low beam LED, a first high beam LED and at least a first additional LED;
   optic elements supported adjacent the LEDs on the circuit board;
   a processor; and
   a remote communication module coupled to the processor, the remote communication module configured to receive commands from a wireless device, wherein the commands instruct the processor to illuminate the at least one additional LED;
   wherein the processor controls the at least one additional LED based on the received wireless commands; and
   wherein the at least a first additional LED includes at least a first LED that is aligned with a laterally projecting optic lens that directs light laterally.

2. The assembly of claim 1 further including a connector for connecting the assembly to a power source and to original equipment control cables for receiving control signals for controlling the high and low beam LEDs.

3. The assembly of claim 2 wherein the at least a first high beam LED includes a plurality of high beam LEDs and wherein the at least a first low beam LED includes a plurality of low beam LEDs.

4. The assembly of claim 3 wherein the at least a first additional LED includes a plurality of additional LEDs.

5. The assembly of claim 1 wherein the at least a first additional LED includes a plurality of LEDs and wherein the plurality of LEDs includes a first subset of a first color and a second subset of a second color.

6. The assembly of claim 1 wherein the headlight assembly is mounted as a right side headlight assembly to a vehicle, the laterally projecting optic directing light laterally to the left side of the vehicle.

7. The assembly of claim 1 wherein the laterally projecting optic protrudes in a forward direction and includes a light emitting surface proximate a lateral portion of the headlight assembly.

8. The assembly of claim 7 further including at least another additional LED and an associated optic adjacent the another additional LED.

9. The assembly of claim 1 wherein the headlight has a height dimension and wherein optics associated with the at least a first additional LED are centrally located with respect to the height dimension.

10. The assembly of claim 9 wherein the at least a first additional LED includes at least first and second LEDs, optics associated with the first LED and optics associated with the second LED configured to facilitate different types of lighting effects.

11. The assembly of claim 1 wherein the at least a first additional LED is controlled to be illuminates as a day running light.

12. The assembly of claim 11 wherein optics adjacent the at least a first additional LED include a diffusion plate.

13. The assembly of claim 12 wherein optics adjacent the at least a first additional LED include an optic lens adjacent the diffusion plate.

14. The assembly of claim 1 wherein the processor is programmable and wherein the at least a first additional LED is programmable to operate in at least first and second different ways.

15. The assembly of claim 14 wherein the processor further receives programming signals wirelessly from a computing device usable to program the processor.

16. The assembly of claim 1 wherein the at least a first additional LED includes at least one lateral light beam LED and at least one day running light LED.

17. A remotely controllable headlight assembly for use on a vehicle, the assembly comprising:
   a circuit board including a first plurality of low beam LEDs, a second plurality of high beam LEDs, a third plurality of LEDs, and at least one additional LED;
   optic elements supported adjacent each of the LEDs on the circuit board;
   a processor; and
   a connector for connecting the assembly to a power source and to original equipment control cables for receiving control signals from original equipment user inputs for controlling the first and second pluralities of LEDs; and
   a wireless transceiver for receiving control signals independent of the original equipment control cables for controlling the at least one additional LED to create a lateral light beam pattern.

18. The assembly of claim 17 wherein the connector assembly includes dual connectors for connecting to a first original equipment head light cable and a second original equipment turn signal control cable.

19. The assembly of claim 18 wherein the third plurality of LEDs are controlled as a turn signal indicator.

20. The assembly of claim 19 wherein the third plurality of LEDs operates as a day running light when not controlled as a turn signal indicator.

21. A remotely controllable headlight assembly for use on a vehicle, the assembly comprising:
   a headlight housing forming a cavity;
   a transparent headlight cover lens having a height dimension and mounted to the housing to cover the cavity, the cover lens having a vertical centerline;
   a circuit board including a first plurality of low beam LEDs, a second plurality of high beam LEDs, a third plurality of turn signal LEDs and at least one side beam LED, the circuit board mounted within the cavity;
   a side beam optic lens mounted to one side of the vertical centerline and adjacent the side beam LED to direct light in a direction generally toward and past away from the vertical center line;
   a turn signal optic that extends from adjacent the side beam optic lens across the vertical centerline, the turn signal optic adjacent the third plurality of turn signal LEDs;
   a plurality of high beam optic elements, a separate high beam optic element adjacent each one of the second plurality of LEDs, a subset of the high beam optic elements above the turn signal optic, and a subset of the high beam optic elements below the turn signal optic; and a plurality of low beam optic elements, a separate low beam optic element adjacent each one of the first plurality of LEDs, all of the low beam optic elements above the turn signal optic.

22. The assembly of claim 21 further including:

a processor; and a remote communication module coupled to the processor, the remote communication module configured to receive commands from a wireless device, wherein the commands instruct the processor to control illumination of at least a subset of the LEDs;

wherein the processor controls the at least a subset of the LEDs based on the received wireless commands.

23. A remotely controllable headlight assembly for use on a vehicle, the assembly comprising:

a headlight housing forming a cavity;

a transparent headlight cover lens having a height dimension and mounted to the housing to cover the cavity, the cover lens having a vertical centerline;

a circuit board including a first plurality of low beam LEDs, a second plurality of high beam LEDs, a third plurality of turn signal LEDs and at least one side beam LED, the circuit board mounted within the cavity;

a side beam optic lens mounted to one side of the vertical centerline and adjacent the side beam LED to direct most light generated by the side beam LED in a lateral direction generally toward and past the vertical center line;

a turn signal optic that extends from adjacent the side beam optic lens across the vertical centerline, the turn signal optic adjacent the third plurality of turn signal LEDs;

a plurality of high beam optic elements, a separate high beam optic element adjacent each one of the second plurality of LEDs; and a plurality of low beam optic elements, a separate low beam optic element adjacent each one of the first plurality of LEDs.

24. A remotely controllable headlight assembly for use on a vehicle, the assembly comprising:

a headlight housing forming a cavity;

a transparent headlight cover lens having a height dimension and mounted to the housing to cover the cavity, the cover lens having a vertical centerline;

a circuit board including at least one side beam LED, the circuit board mounted within the cavity; and a side beam optic lens mounted to one side of the vertical centerline and adjacent the side beam LED to direct most light generated by the side beam LED in a direction generally toward and past the vertical center line.

* * * * *

UNITED STATES PATENT AND TRADEMARK OFFICE
CERTIFICATE OF CORRECTION

PATENT NO. : 11,021,095 B2
APPLICATION NO. : 16/414102
DATED : June 1, 2021
INVENTOR(S) : Jeffrey L. Spenner et al.

Page 1 of 1

It is certified that error appears in the above-identified patent and that said Letters Patent is hereby corrected as shown below:

In the Claims

Column 30, Claim 21, Lines 60-61, "toward and past away from" should read --toward and past--.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*